US012462749B2

(12) United States Patent
Lee et al.

(10) Patent No.: US 12,462,749 B2
(45) Date of Patent: Nov. 4, 2025

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Do Hyun Kim, Paju-si (KR); Hyun Soo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/486,017

(22) Filed: Oct. 12, 2023

(65) Prior Publication Data

US 2024/0257743 A1 Aug. 1, 2024

(30) Foreign Application Priority Data

Jan. 26, 2023 (KR) ........................ 10-2023-0009820

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/0262* (2013.01); *G09G 2310/08* (2013.01); *G09G 2320/0233* (2013.01); *G09G 2320/045* (2013.01); *G09G 2330/021* (2013.01)

(58) Field of Classification Search
CPC ......... G09G 3/3233; G09G 2300/0852; G09G 2320/0233; G09G 2300/0833; G09G 2300/0842; G09G 2300/0819; G09G 2310/0262; G09G 2310/08; G09G 2320/045; G09G 2330/021; G09G 3/3266; G09G 2300/0426; G09G 2300/043
See application file for complete search history.

(56) References Cited

U.S. PATENT DOCUMENTS

| | | | | |
|---|---|---|---|---|
| 2005/0269959 A1* | 12/2005 | Uchino | ................ | G02B 6/4268 315/169.3 |
| 2006/0244688 A1* | 11/2006 | Ahn | ..................... | G09G 3/3233 345/76 |
| 2016/0063922 A1* | 3/2016 | Tsai | ..................... | G09G 3/3291 345/76 |
| 2018/0005575 A1* | 1/2018 | Lee | ...................... | G09G 3/3225 |
| 2018/0005576 A1* | 1/2018 | Yoon | .................... | G09G 3/3233 |
| 2018/0005601 A1* | 1/2018 | Kim | ..................... | G09G 3/3266 |
| 2021/0358413 A1* | 11/2021 | Chen | .................... | G09G 3/3233 |

FOREIGN PATENT DOCUMENTS

| | | |
|---|---|---|
| KR | 20190052822 A * | 5/2019 |
| KR | 20190057747 A | 5/2019 |
| KR | 20200071433 A | 6/2020 |

* cited by examiner

*Primary Examiner* — Temesghen Ghebretinsae
*Assistant Examiner* — Ivelisse Martinez Quiles
(74) *Attorney, Agent, or Firm* — Seed Intellectual Property Law Group LLP

(57) ABSTRACT

A pixel circuit and a display device including the same are disclosed. The pixel circuit includes a driving element connected to a first node, a second node, and a third node; a capacitor connected between the second node and the third node; a first switch element connected between a data line to which a data voltage of pixel data is applied and the second node; a second switch element connected between the first node and the second node; a third switch element; a fourth switch element; and a light emitting element. When the third switch element is turned on, a reference voltage is applied to the third node or an anode electrode of the light emitting element.

12 Claims, 50 Drawing Sheets

PIXEL CIRCUIT AND DISPLAY DEVICE INCLUDING THE SAME

CROSS-REFERENCE TO RELATED APPLICATION

This application claims priority to and the benefit of Korean Patent Application No. 10-2023-0009820, filed Jan. 26, 2023, the disclosure of which is incorporated herein by reference in its entirety.

BACKGROUND

Technical Field

The present disclosure relates to a pixel circuit and a display device including the same.

Description of the Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Pixels of an organic light emitting display device include a pixel circuit including a driving element for driving the OLED, and a capacitor connected to the driving element.

Due to process deviations and device characteristic deviations resulting from the manufacturing process of the display panel, there may be differences in the electrical characteristics of the driving element for each pixel. These differences may increase as the driving time of the pixels elapses. In order to compensate for the differences in the electrical characteristics of the driving element for each pixel, an internal compensation circuit may be added to the pixel circuit. The internal compensation circuit may sample a threshold voltage of the driving element and compensate a gate voltage of the driving element by the amount of the threshold voltage of the driving elements.

The internal compensation circuit may be divided into a source follower circuit and a diode connection circuit. The diode connection circuit may have good compensation performance because the threshold voltage loss of the driving element is small, but it may has insufficient sampling time because the threshold voltage of the driving element is sampled at the same time as the data voltage is addressed. In the case of the internal compensation circuit using the diode connection circuit, it is difficult to secure the sampling time of the threshold voltage of the driving element because a horizontal period becomes smaller when driving a high-resolution display panel or when driving a display panel at high speed.

BRIEF SUMMARY

The inventors have realized that the diode connection circuit may have good compensation performance because the threshold voltage loss of the driving element is small, but it may has insufficient sampling time because the threshold voltage of the driving element is sampled at the same time as the data voltage is addressed. In the case of the internal compensation circuit using the diode connection circuit, it is difficult to secure the sampling time of the threshold voltage of the driving element because a horizontal period becomes smaller when driving a high-resolution display panel or when driving a display panel at high speed.

The present disclosure has been made in an effort to address aforementioned drawbacks.

The present disclosure provides a pixel circuit that is capable of sufficiently securing a sampling time of a driving element and improving compensation performance of a threshold voltage of the driving element in the pixel circuit including a diode connection circuit, and a display device including the pixel circuit.

The problems or limitations to be solved or addressed by the present disclosure are not limited to those mentioned above, and other problems or limitations not mentioned will be clearly understood by those skilled in the art from the following description.

A pixel circuit according to one embodiment of the present disclosure may include a driving element configured to include a first electrode connected to a first node, a gate electrode connected to a second node, and a second electrode connected to a third node; a capacitor connected between the second node and the third node; a first switch element connected between a data line to which a data voltage of pixel data is applied and the second node to be turned on in response to a first gate signal; a second switch element connected between the first node and the second node to be turned on in response to a second gate signal; a third switch element turned on in response to the second gate signal; a fourth switch element turned on in response to a third gate signal to connect a first constant voltage node to which a pixel driving voltage is applied to the first node; and a light element configured to include an anode electrode connected to the third node and a cathode electrode connected to a second constant voltage node to which a cathode voltage is applied. When the third switch element is turned on, a reference voltage may be applied to the third node or the anode electrode of the light emitting element.

The pixel circuit may be driven in the order of a first period, a second period, a third period, and a fourth period. A voltage of the first gate signal may be a gate-on voltage during the third period and may be a gate-off voltage during the first, second, and fourth periods. A voltage of the second gate signal may be the gate-on voltage during the first and second periods, and may be the gate-off voltage during the third and fourth periods. A voltage of the third gate signal may be the gate-on voltage during the first and fourth periods, and may be the gate-off voltage during the second and third periods. The first switch element is turned on in response to the gate-on voltage of the first gate signal and turned off depending on the gate-off voltage of the first gate signal. The second and third switch elements are turned on in response to the gate-on voltage of the second gate signal and turned off depending on the gate-off voltage of the second gate signal. The fourth switch element is turned on in response to the gate-on voltage of the third gate signal and turned off depending on the gate-off voltage of the third gate signal.

The voltage of the first gate signal may inverted to the gate-on voltage after the voltage of the second gate signal is inverted to the gate-off voltage within a first delay time between the second period and the third period. The voltage of the third gate signal may inverted to the gate-on voltage after the voltage of the first gate signal is inverted to the gate-off voltage within a second delay time between the third period and the fourth period.

The pixel circuit further includes a fifth switch element configured to be turned on in response to a fourth gate signal to connect the third node to the anode electrode of the light emitting element.

The pixel circuit may be driven in the order of a first period, a second period, a third period, and a fourth period. A voltage of the first gate signal may be a gate-on voltage during the third period and may be a gate-off voltage during the first, second, and fourth periods. A voltage of the second gate signal may be the gate-on voltage during the first and second periods, and may be the gate-off voltage during the third and fourth periods. A voltage of the third gate signal may be the gate-on voltage during the first and fourth periods, and may be the gate-off voltage during the second and third periods. A voltage of the fourth gate signal may be the gate-on voltage during the second and fourth periods, and may be the gate-off voltage during the first and third periods. The first switch element is turned on in response to the gate-on voltage of the first gate signal and turned off depending on the gate-off voltage of the first gate signal. The second and third switch elements are turned on in response to the gate-on voltage of the second gate signal and turned off depending on the gate-off voltage of the second gate signal. The fourth switch element is turned on in response to the gate-on voltage of the third gate signal and turned off depending on the gate-off voltage of the third gate signal. The fifth switch element is turned on in response to the gate-on voltage of the fourth gate signal and turned off depending on the gate-off voltage of the fourth gate signal.

The voltage of the fourth gate signal may be inverted to the gate-on voltage after the voltage of the third gate signal is inverted to the gate-off voltage within a first delay time between the first period and the second period. The fourth gate signal may be inverted to the gate-off voltage before the second gate signal is inverted to the gate-off voltage within a second delay time between the second period and the third period. The fourth gate signal may be inverted to the gate-on voltage after the third gate signal is inverted to the gate-on voltage within a third delay time between the third period and the fourth period.

The pixel circuit may be driven in the order of a first period, a second period, a third period, and a fourth period. A voltage of the first gate signal may be a gate-on voltage during the third period and may be a gate-off voltage during the first, second, and fourth periods. A voltage of the second gate signal may be the gate-on voltage during the first and second periods, and may be the gate-off voltage during the third and fourth periods. A voltage of the third gate signal may be the gate-on voltage during the first and fourth periods, and may be the gate-off voltage during the second and third periods. A voltage of the fourth gate signal may be the gate-on voltage during the fourth period, and may be the gate-off voltage during the first to third periods. The first switch element is turned on in response to the gate-on voltage of the first gate signal and turned off depending on the gate-off voltage of the first gate signal. The second and third switch elements are turned on in response to the gate-on voltage of the second gate signal and turned off depending on the gate-off voltage of the second gate signal. The fourth switch element is turned on in response to the gate-on voltage of the third gate signal and turned off depending on the gate-off voltage of the third gate signal. The fifth switch element is turned on in response to the gate-on voltage of the fourth gate signal and turned off depending on the gate-off voltage of the fourth gate signal.

The first gate signal may be inverted to the gate-on voltage after the voltage of the second gate signal is inverted to the gate-off voltage within a first delay time between the second period and the third period. The fourth gate signal may be inverted to the gate-on voltage after the third gate signal is inverted to the gate-on voltage within a second delay time between the third period and the fourth period.

A pixel circuit according to another embodiment of the present disclosure may include: a driving element including a first electrode connected to a first node, a gate electrode connected to a second node, and a second electrode connected to a third node; a capacitor connected between the second node and the third node; a first switch element connected between a data line to which a data voltage of pixel data is applied and the second node to be turned on in response to a first gate signal; a second switch element connected between the first node and the second node to be turned on in response to a second gate signal; a third switch element configured to be turned on in response to a fifth gate signal to apply a reference voltage to the third node; a fourth switch element configured to be turned on in response to a third gate signal to connect a first voltage node to which a pixel driving voltage is applied to the first node; a light emitting element including an anode electrode connected to the third node and a cathode electrode connected to a second voltage node to which a cathode voltage is applied; a fifth switch element configured to be turned on in response to a fourth gate signal to connect the third node to the anode electrode of the light emitting element; and a sixth switch element configured to be turned on in response to a fifth gate signal to apply an anode reset voltage to the anode electrode of the light emitting element.

The pixel circuit may be driven in the order of a first period, a second period, a third period, a fourth period, and a fifth period. A voltage of the first gate signal may be a gate-on voltage during the third period, and may be a gate-off voltage during the first, second, and fourth periods. A voltage of the second gate signal may be the gate-on voltage during the first and second periods, and may be the gate-off voltage during the third and fourth periods. A voltage of the third gate signal may be the gate-on voltage during the first and fifth periods, and may be the gate-off voltage during the second and third periods. A voltage of the fourth gate signal may be the gate-on voltage during the fifth period, and is the gate-off voltage during the first to third periods. A voltage of the fifth gate signal may be the gate-on voltage during the first, second, and fourth periods, and is the gate-off voltage during the third and fifth periods. The first switch element is turned on in response to the gate-on voltage of the first gate signal, and turned off depending on the gate-off voltage of the first gate signal. The second switch element is turned on in response to the gate-on voltage of the second gate signal, and turned off depending on the gate-off voltage of the second gate signal. The fourth switch element is turned on in response to the gate-on voltage of the third gate signal, and turned off depending on the gate-off voltage of the third gate signal. The fifth switch element is turned on in response to the gate-on voltage of the fourth gate signal, and turned off depending on the gate-off voltage of the fourth gate signal. The third and sixth switch elements are turned on in response to the gate-on voltage of the fifth gate signal, and turned off depending on the gate-off voltage of the fifth gate signal.

The second gate signal may be inverted to the gate-off voltage after the fifth gate signal is inverted to the gate-off voltage within a first delay time between the second period and the third period. The fifth gate signal may be inverted to the gate-on voltage after the first gate signal is inverted to the gate-off voltage within a second delay time between the third period and the fourth period. The third gate signal may be inverted to the gate-on voltage after the fifth gate signal is inverted to the gate-off voltage within a third delay time between the fourth period and the fifth period, and then the fourth gate signal is inverted to the gate-on voltage.

The pixel circuit may further include a second capacitor connected between the first voltage node and the third node or connected between the third node and the second voltage node.

A display device according to one embodiment of the present disclosure may include the pixel circuit.

According to the present disclosure, time for sensing the threshold voltage of the driving element may be sufficiently secured by temporally separating a step of sensing the threshold voltage and a step of writing pixel data to the pixels during the driving period of the pixel circuit including the diode connection circuit, thereby sufficiently securing a threshold voltage sensing period of the driving element when driving a display panel at high resolution and high speed.

The present disclosure may improve process efficiency and yield of a display panel by implementing five transistors of a pixel circuit including a diode connection circuit.

The present disclosure may prevent luminance fluctuations of pixels when a driving frequency of pixels is changed as a refresh rate is varied by setting an anode reset voltage separate from a reference voltage.

The present disclosure may realize low-power driving by reducing leakage current and power consumption in a display device including a pixel circuit including a diode connection circuit, and may prevent short circuit or electrical interference between main nodes of the pixel circuit.

The present disclosure may realize low-power driving of a display device by supporting a low-speed driving mode.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
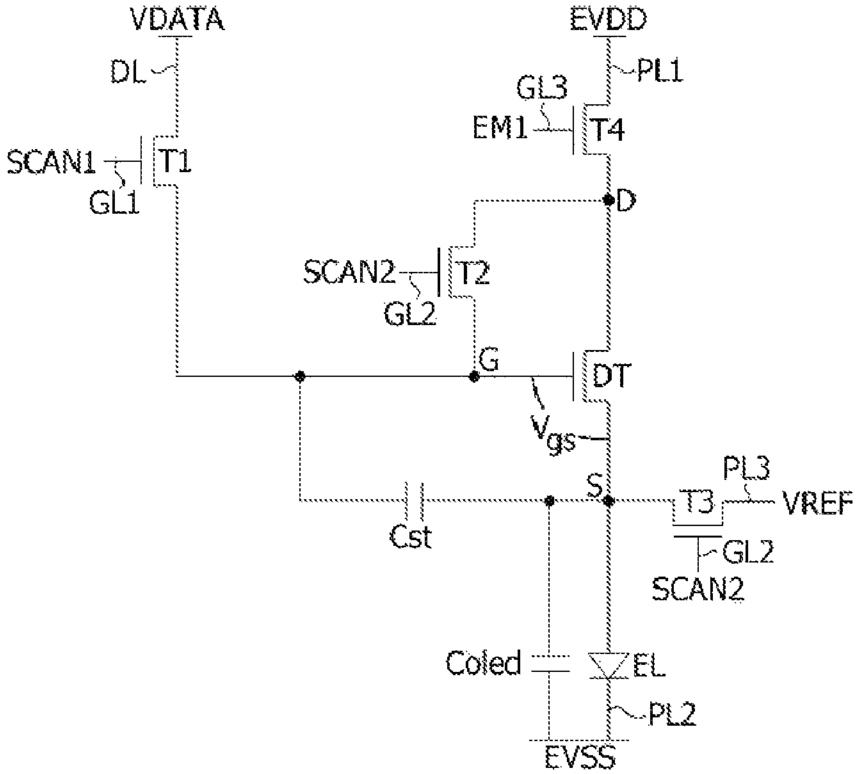
FIG. 1 is a circuit diagram showing a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors used as switch elements or driving elements. Each of the sub-pixels includes a pixel circuit. The transistor may be implemented as a TFT (Thin Film Transistor). The transistors may be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage, and the gate-off voltage may be a gate low voltage.

Hereinafter, various embodiments of the present disclosure will be described in detail with reference to the accompanying drawings.

Figure 2:
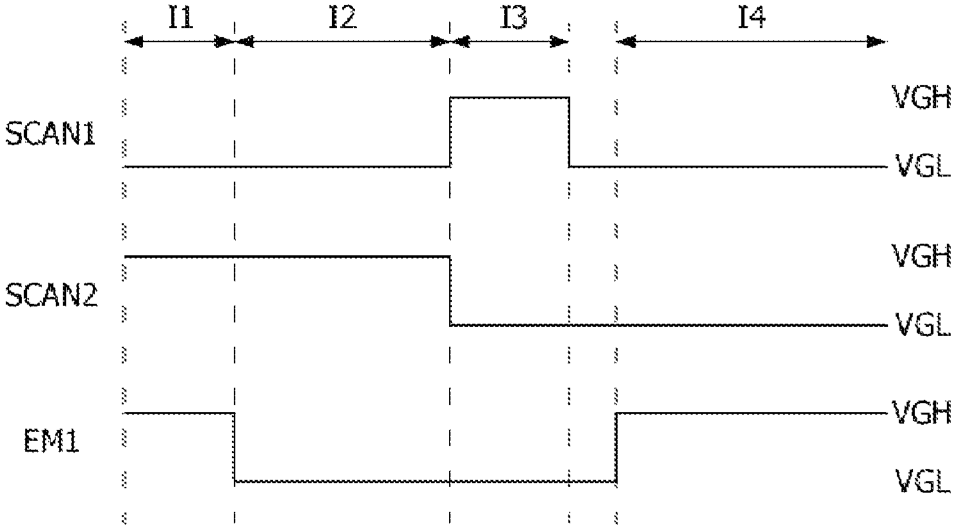
FIG. 2 are a waveform diagram showing waveforms of gate signals applied to the pixel circuit shown in FIG. 1.

FIG. 1 is a circuit diagram showing a pixel circuit according to a first embodiment of the present disclosure. FIG. 2 is a waveform diagram showing waveforms of gate signals applied to the pixel circuit shown in FIG. 1.

Referring to FIGS. 1 and 2, the pixel circuit includes a light emitting element EL, a driving element DT for driving the light emitting element EL, a plurality of switch elements T1 to T4, and a capacitor Cst. The driving element DT and the switch elements T1 to T4 may be implemented with n-channel oxide TFTs.

The pixel circuit is connected to a data line DL to which a data voltage VDATA is applied and gate lines GL1 to GL3 to which gate signals SCAN1, SCAN2, and EM1 are applied. The pixel circuit is connected to power nodes to which DC voltages (or constant voltages) is applied such as a first constant voltage node PL1 to which a pixel driving voltage EVDD is applied, a second constant voltage node PL2 to which the cathode voltage EVSS is applied, and a third constant voltage node PL3 to which a reference voltage VREF is applied, and the like. The power lines connected to constant voltage nodes on the display panel may be commonly connected to all pixels.

The pixel driving voltage EVDD is higher than a maximum voltage of the data voltage VDATA and is set to a voltage at which the driving element DT may be operated in a saturation region. The reference voltage VREF is a voltage lower than the pixel driving voltage EVDD. The cathode voltage EVSS is a voltage lower than the reference voltage VREF. A gate-on voltage VGH may be set to a voltage higher than the pixel driving voltage EVDD, and a gate-off voltage VGL may be set to a voltage lower than the cathode voltage EVSS. For example, the pixel driving voltage EVDD may be a voltage selected within a voltage range of 10 [V] to 17 [V], and the cathode voltage EVSS may be a voltage selected within a voltage range of −8 [V] to −0.5 [V], the gate-on voltage VGH may be a voltage selected within the voltage range of 15 [V] to 22 [V], the gate-off voltage VGL may be a voltage selected within the voltage range of −20 [V] to −5 [V], and the reference voltage VREF may be set to a voltage selected within the voltage range of −2 [V] to 5 [V].

The gate signals SCAN1, SCAN2, and EM1 include a pulse swinging between the gate-on voltage VGH and the gate-off voltage VGL. The gate signals SCAN1, SCAN2, and EM1 include a first gate signal SCAN1, a second gate signal SCAN2, and a third gate signal EM1.

A driving period of the pixel circuit may be divided into first to fourth periods I1 to I4. The first to fourth periods I1 to I4 may be defined by waveforms of the gate signals SCAN1, SCAN2, and EM1. A floating period may be set between the third period I3 and the fourth period I4, during which the voltages of the gate signals SCAN1, SCAN2, and EM1 are gate-off voltage VGL.

The voltage of the first gate signal SCAN1 is generated as a pulse of the gate-on voltage VGH synchronized with the data voltage VDATA of the pixel data during the third period I3, and is the gate-off voltage VGL during the other periods I1, I2, and I4 other than the third period I3. The first switch element T1 is turned on in response to the gate-on voltage VGH of the first gate signal SCAN1.

The voltage of the second gate signal SCAN2 is the gate-on voltage VGH during the first and second periods I1 and I2, and is the gate-off voltage VGL during the third and fourth periods I3 and I4. The second and third switch elements T2 and T3 are turned on in response to the gate-on voltage VGH of the second gate signal SCAN2.

The voltage of the third gate signal EM1 is the gate-on voltage VGH during the first and fourth periods I1 and I4, and is the gate-off voltage VGL during the second and third periods I2 and I3. The fourth switch element T4 is turned on in response to the gate-on voltage VGH of the third gate signal EM1.

The driving element DT drives the light emitting element EL by generating a current depending on a gate-source voltage Vgs. The driving element DT includes a first electrode connected to a first node D, a gate electrode connected to a second node G, and a second electrode connected to a third node S.

The light emitting element EL may be implemented with an OLED. The light emitting element EL includes an anode electrode, a cathode electrode, and an organic compound layer formed between the electrodes. The anode electrode of the light emitting element EL is connected to the third node S, and the cathode electrode is connected to the second constant voltage node PL2 to which the cathode voltage EVSS is applied. A capacitor Coled may be formed between the anode electrode and the cathode electrode of the light emitting element EL. The organic compound layer includes a hole injection layer (HIL), a hole transport layer (HTL), a light emitting layer (EML), an electron transport layer (ETL), and an electron injection layer (EIL), but is not limited thereto. When the voltage is applied to the anode and cathode electrodes of the light emitting element EL, holes passing through the hole transport layer (HTL) and electrons passing through the electron transport layer (ETL) are moved to the light emitting layer (EML) to form excitons. In this case, visible light is emitted from the light emitting layer (EML). The light emitting element EL may be implemented with a tandem structure in which a plurality of light emitting layers are stacked. The light emitting element EL of the tandem structure may improve luminance and lifetime of pixels.

The capacitor Cst is connected between the second node G and the third node S. After the capacitor Cst is initialized in the first period I1, a threshold voltage Vth of the driving element DT is stored in the second period I2. The capacitor Cst stores the data voltage VDATA of the compensated pixel data by the threshold voltage Vth of the driving element DT in the third period I3, and then the gate-to-source voltage Vgs of the driving element DT is maintained during the fourth period I4.

The first switch element T1 is connected between the data line DL and the second node G to be turned on in response to a pulse of the first gate signal SCAN1 generated as the gate-on voltage VGH during the third period I3. When the first switch element T1 is turned on, the data voltage VDATA of pixel data is applied to the second node G. The first switch element T1 is in an off-state during the other periods I1, I2, and I4 other than the third period I3. The first switch element T1 includes a first electrode connected to the data line DL to which the data voltage VDATA is applied, a gate electrode connected to the first gate line GL1 to which the first gate signal SCAN1 is applied, and a second electrode connected to the second node G.

The second switch element T2 is turned on in response to the gate-on voltage VGH of the second gate signal SCAN2 during the first and second periods I1 and I2. When the second switch element T2 is turned on, the first node D and the second node G are connected so that the driving element DT is operated as a diode. The second switch element T2 is in an off-state during the third and fourth periods I3 and I4. The second switch element T2 includes a first electrode connected to the first node D, a gate electrode connected to the second gate line GL2 to which the second gate signal SCAN2 is applied, and a second electrode connected to the second node G.

The third switch element T3 is turned on in response to the gate-on voltage VGH of the second gate signal SCAN2 during the first and second periods I1 and I2. When the third switch element T3 is turned on, the reference voltage VREF is applied to the third node S. The third switch element T3 is in an off-state during the third and fourth periods I3 and I4. The third switch element T3 includes a first electrode connected to the third node S, a gate electrode connected to the second gate line GL2 to which the second gate signal SCAN2 is applied, and a second electrode connected to the third constant voltage node PL3 to which the reference voltage VREF is applied.

The fourth switch element T4 is turned on in response to the third gate signal EM1 generated as the gate-on voltage VGH during the first and fourth periods I1 and I4. When the fourth switch element T4 is turned on, the pixel driving voltage EVDD is applied to the first electrode of the driving element DT. The fourth switch element T4 is in an off-state during the second and third periods I2 and I3. The fourth switch element T4 includes a first electrode connected to the first constant voltage node PL1 to which the pixel driving voltage EVDD is applied, a gate electrode connected to the third gate line GL3 to which the third gate signal EM1 is applied, and a second electrode connected to the first node D.

FIG. 3A to 6B are diagrams gradationally showing a driving period of the pixel circuit shown in FIG. 1.

Figure 3A:
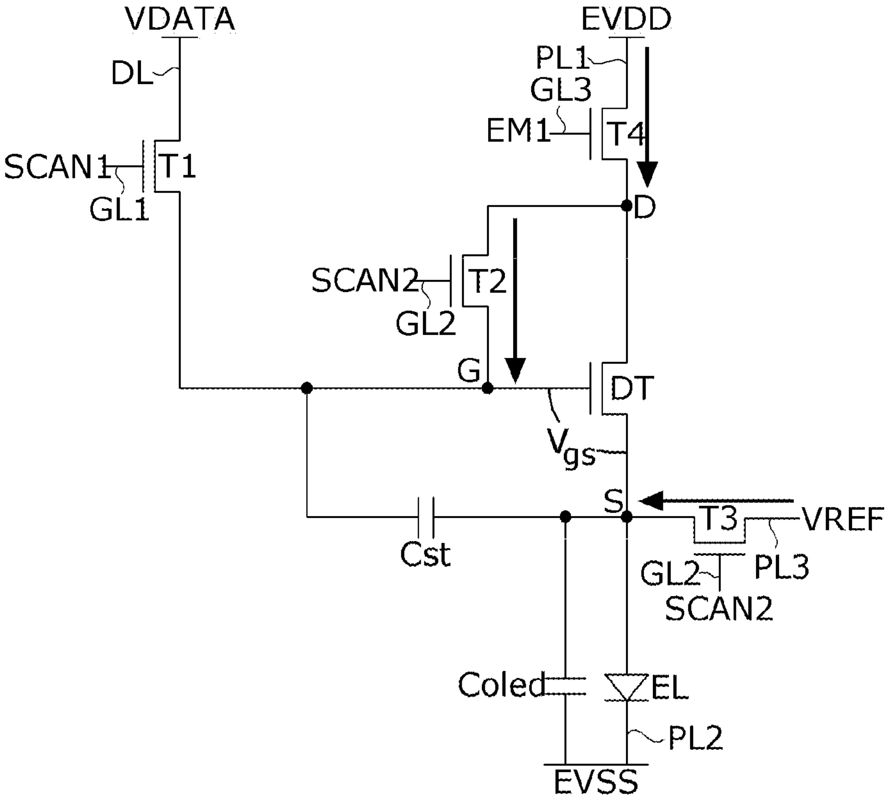
FIGS. 3A, 3B, 4A, 4B, 5A, 5B, 6A, and 6B are circuit and timing diagrams showing a driving period of the pixel circuit shown in FIG. 1 at different times during operation.
Figure 3B:
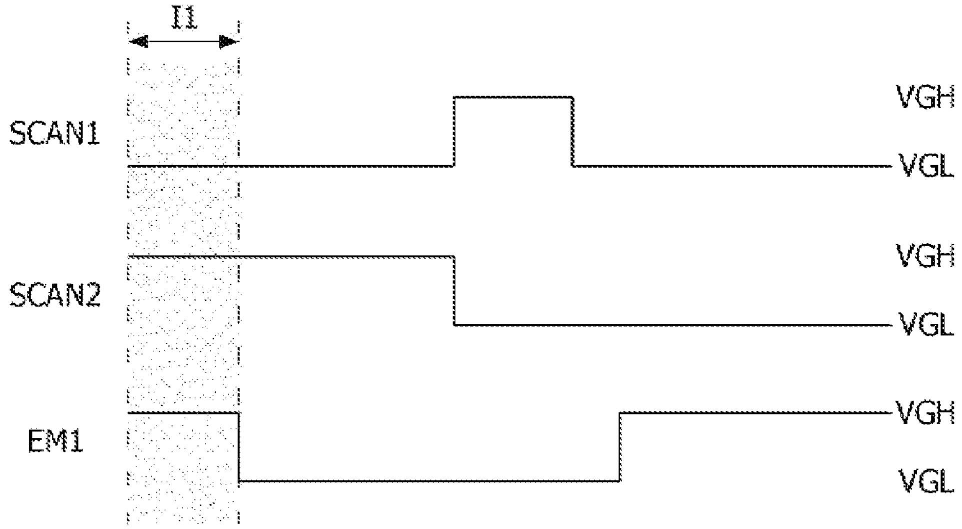

FIG. 3A is a circuit diagram showing a current flowing in the pixel circuit during the first period I1. FIG. 3B is a waveform diagram showing gate signals SCAN1, SCAN2, and EM1 during the first period I1.

Referring to FIGS. 3A and 3B, main nodes of the pixel circuit are initialized during the first period I1. During the first period I1, voltages of the second and third gate signals SCAN2 and EM1 are the gate-on voltage VGH. During the first period I1, the voltage of the first gate signal SCAN1 is the gate-off voltage VGL. Therefore, during the first period I1, the second, third, and fourth switch elements T2, T3, and T4 are turned on, and the first switch element T1 is turned off. At the end of the first period I1, a voltage of the second node G is the pixel driving voltage EVDD, and a voltage of the third node S and an anode voltage of the light emitting element EL are the reference voltage VREF. At the end of the first period I1, a voltage of the capacitor Cst is EVDD-VREF, the gate-source voltage Vgs of the driving element DT is also EVDD-VREF.

Figure 4A:
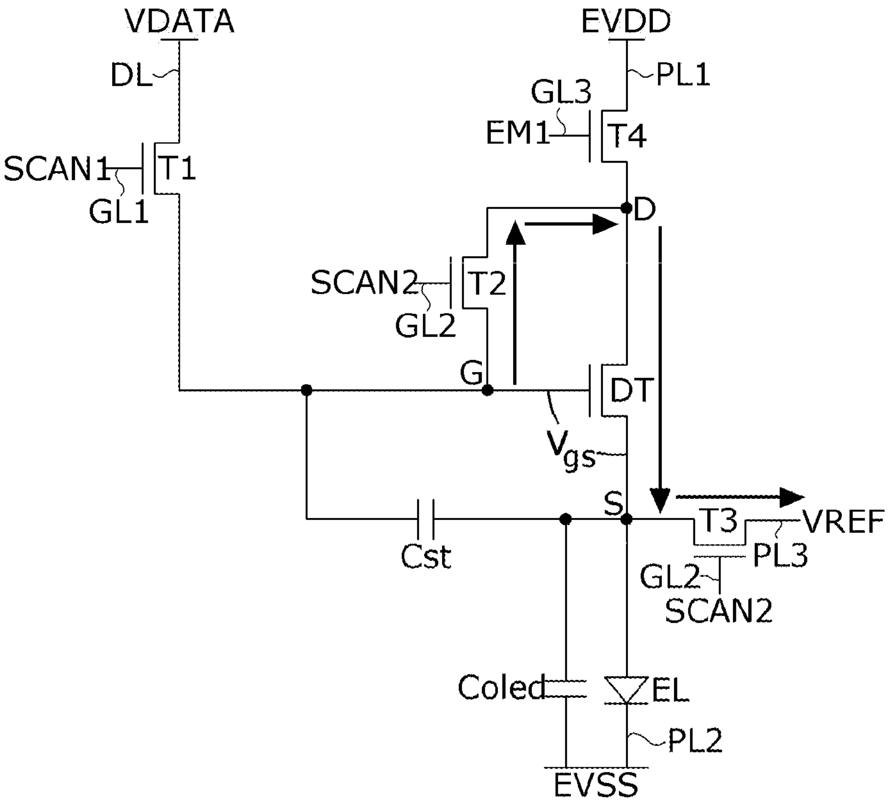
Figure 4B:
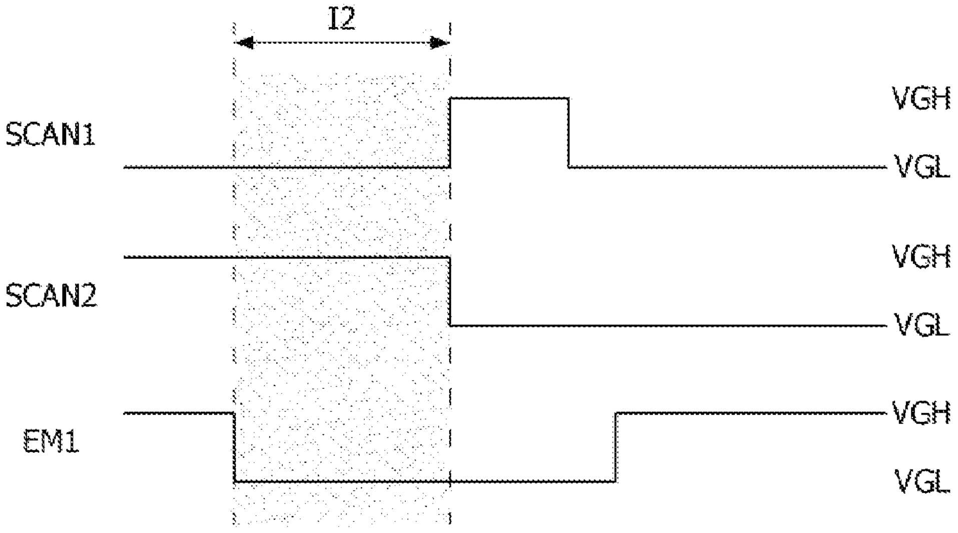

FIG. 4A is a circuit diagram showing a current flowing in the pixel circuit during the second period I2. FIG. 4B is a waveform diagram showing gate signals SCAN1, SCAN2, and EM1 during the second period I2.

Referring to FIGS. 4A and 4B, the threshold voltage Vth of the driving element DT is stored in the capacitor Cst during the second period I2. During the second period I2, a voltage of the second gate signal SCAN2 is the gate-on voltage VGH, and voltages of the first and third gate signals SCAN1 and EM1 are the gate-off voltage VGL. During the second period I2, the second and third switch elements T2 and T3 and the driving element DT are turned on, and the first and fourth switch elements T1 and T4 are turned off. At the end of the second period I2, a voltage of the second node G is VREF+Vth, and a voltage of the third node S and the anode voltage of the light emitting element EL are the reference voltage VREF. Here, "Vth" is a threshold voltage of the driving element DT. At the end of the second period I2, the gate-source voltage Vgs of the driving element DT reaches the threshold voltage Vth, so the driving element DT is turned off, and the voltage of the capacitor Cst and the gate-source voltage Vgs of the driving element DT are the threshold voltage Vth.

Figure 5A:
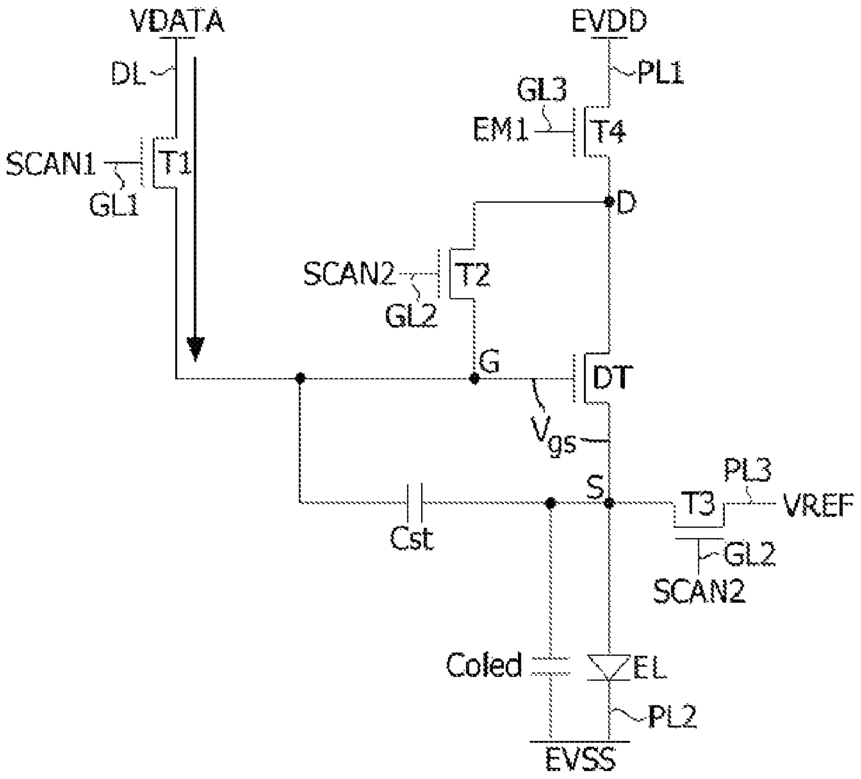
Figure 5B:
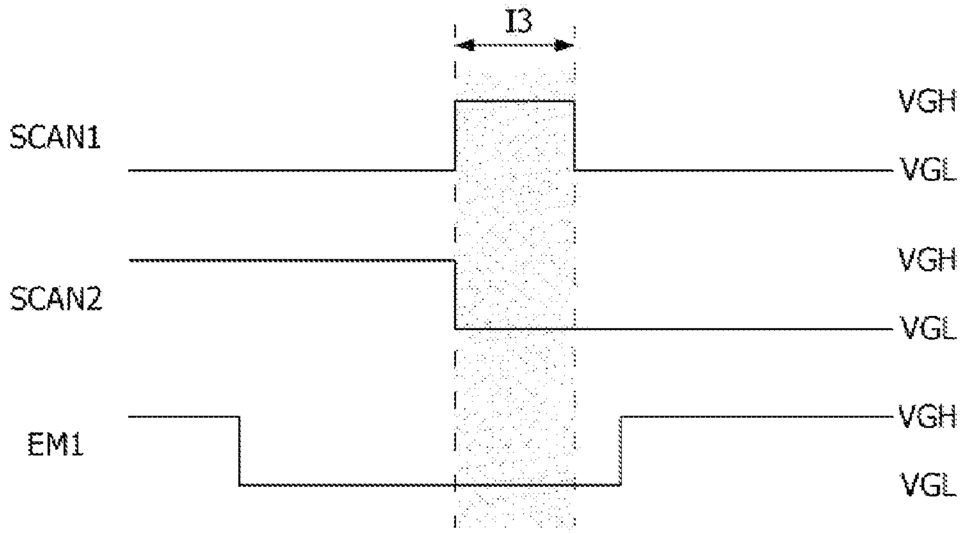

FIG. 5A is a circuit diagram showing a current flowing in the pixel circuit during the third period I3. FIG. 5B is a waveform diagram showing gate signals SCAN1, SCAN2, and EM1 during the third period I3.

Referring to FIGS. 5A and 5B, the data voltage VDATA of pixel data is applied to the second node G during the third period I3. During the third period I3, the voltage of the first gate signal SCAN1 is the gate-on voltage VGH, and the voltages of the second and third gate signals SCAN2 and EM1 are the gate-off voltage VGL. During the third period I3, the first switch element T1 is turned on, and the second to fourth switch elements T2, T3, and T4 are turned off. At the end of the third period I3, the voltage of the second node G is the data voltage VDATA, and the voltage of the third node S and the anode voltage of the light emitting element EL are VDATA−(Vth+VDATA*C'). Here, C'=1−Cst/(Cst+Coled). Accordingly, at the end of the third period I3, the voltage of the capacitor Cst and the gate-source voltage Vgs of the driving element DT is Vth+VDATA*C'.

Figure 6A:
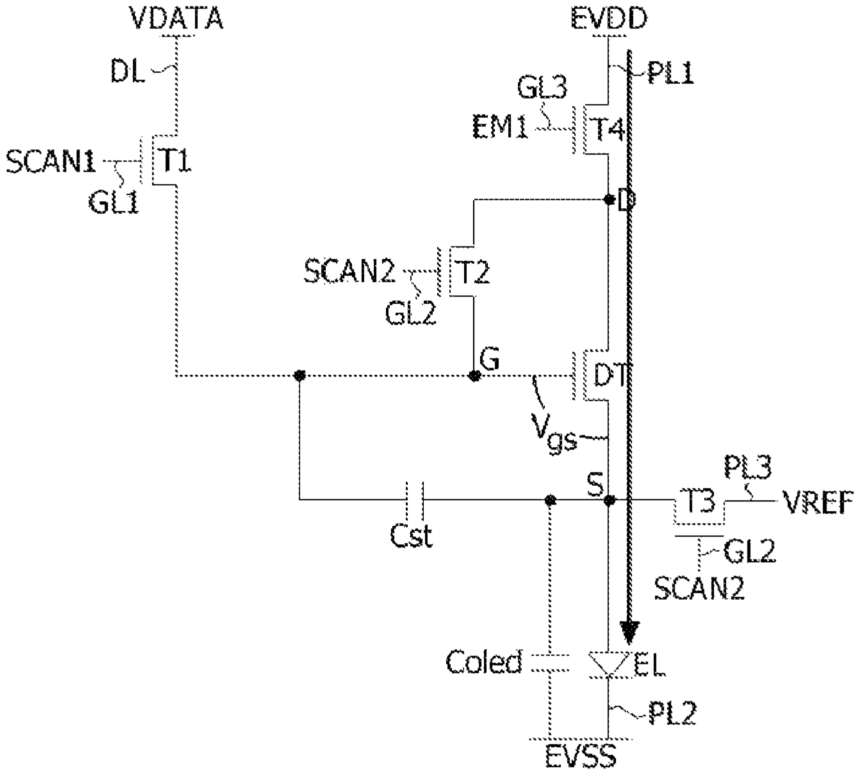
Figure 6B:
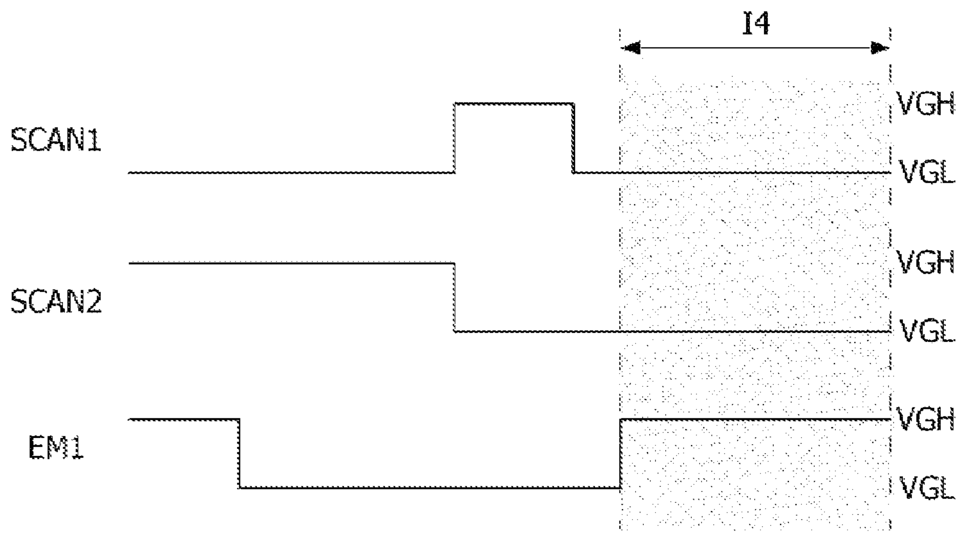

FIG. 6A is a circuit diagram showing a current flowing in a pixel circuit during a fourth period I4. FIG. 6B is a waveform diagram showing gate signals SCAN1, SCAN2, and EM1 during the fourth period I4.

Referring to FIGS. 6A and 6B, during the fourth period I4, the driving element DT generates a current depending on the gate-source voltage Vgs to drive the light emitting element EL. The light emitting element EL may emit light with a luminance corresponding to a grayscale value of pixel data by the current flowing through the driving element DT. During the fourth period I4, the voltage of the third gate signal EM1 is the gate-on voltage VGH, and the voltages of the first and second gate signals SCAN1 and SCAN2 are the gate-off voltage VGL. During the fourth period I4, the fourth switch element T4 is turned on, and the first to third switch elements T1 to T3 are turned off. During the fourth period I4, the voltage of the third node S and the anode voltage of the light emitting element EL are voltages (Voled) determined depending on the current supplied through the driving element DT. During the fourth period I4, the voltage of the second node G is Voled+Vth+VDATA*C'. Therefore, during the fourth period I4, the voltage of the capacitor Cst and the gate-source voltage Vgs of the driving element DT is Vth+VDATA*C'.

Figure 7:
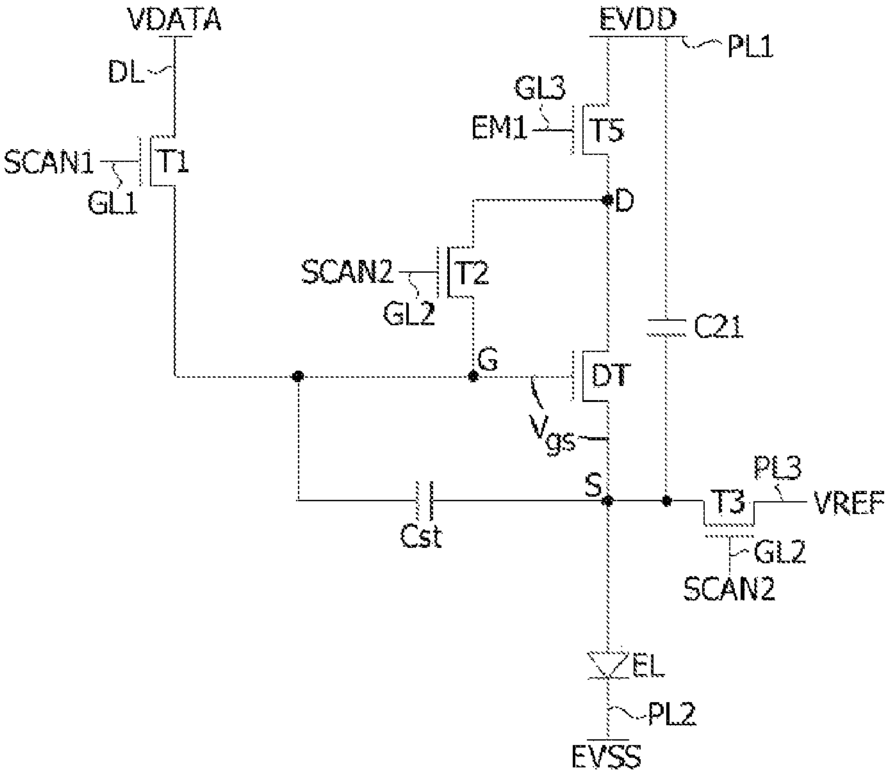
FIG. 7 is a circuit diagram showing a pixel circuit according to a second embodiment of the present disclosure.
Figure 8:
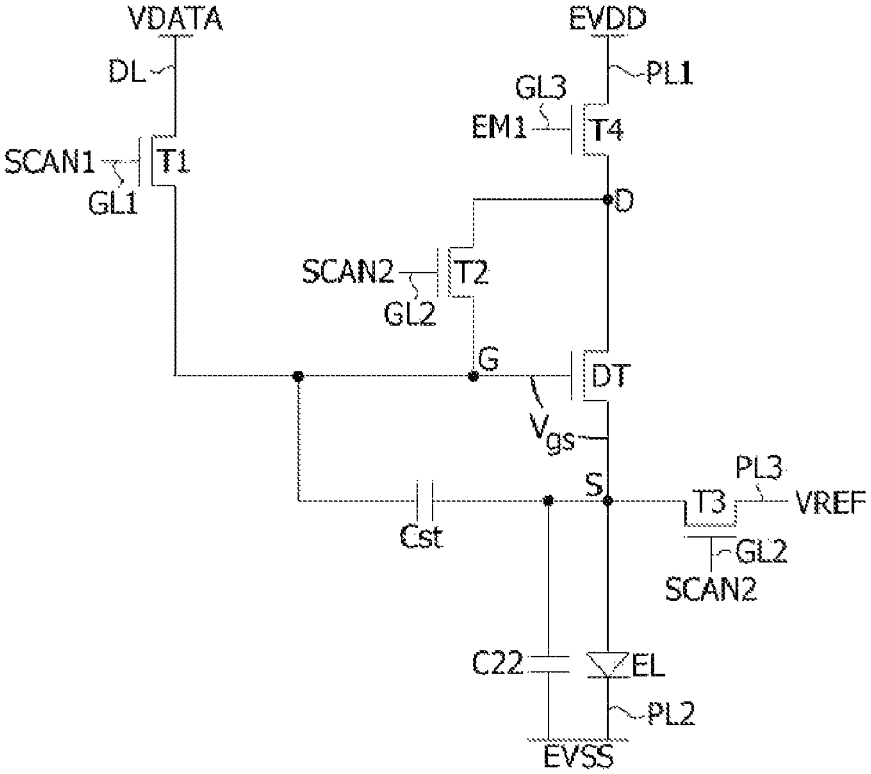
FIG. 8 is a circuit diagram showing a pixel circuit according to a third embodiment of the present disclosure.

FIG. 7 is a circuit diagram showing a pixel circuit according to a second embodiment of the present disclosure. FIG. 8 is a circuit diagram showing a pixel circuit according to a third embodiment of the present disclosure. The gate signals of FIG. 2 or 9 may be applied to the pixel circuits shown in FIGS. 7 and 8. The driving period of the pixel circuits is divided into first to fourth periods I1 to I4, which are substantially the same as those of the first embodiment described above.

Referring to FIGS. 7 and 8, the pixel circuit may further include second capacitors C21 and C22. The second capacitors C21 and C22 are connected between the first constant voltage node PL1 and the third node S as shown in FIG. 7, or may be connected between the third node S and the second constant voltage node PL2 as shown in FIG. 8. The second capacitors C21 and C22 increase transfer efficiency of the data voltage VDATA charged in the capacitor Cst. In the case of the pixel circuit shown in FIGS. 7 and 8, C' affecting the second node G and the third node S during the third and fourth periods I3 and I4 is 1−Cst/(Cst+Coled+C21) or 1−Cst/(Cst+Coled+C22).

If main nodes are short-circuited in a transition process between compensation stages of a pixel circuit including an internal compensation circuit, unnecessary power consumption may occur due to leakage current, and the voltages of the main nodes may be varied. For example, leakage current may be generated when on-periods of the first to third switch elements T1, T2, and T3 are overlapped with each other. To prevent this, the waveforms of the gate signals SCAN1, SCAN2, and EM1 may be varied as shown in FIG. 9.

Figure 9:
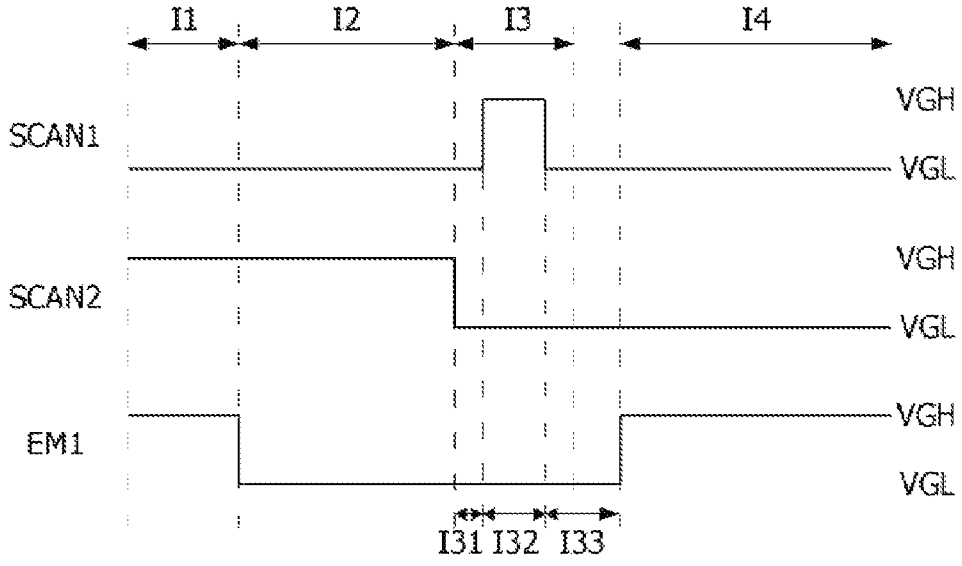
FIG. 9 is a waveform diagram showing other waveforms of gate signals applied to the pixel circuits shown in FIGS. 1, 7, and 8.

Referring to FIG. 9, during a third period I3 in which pixel data is written (or addressed) to pixels of a pixel line, in order to prevent interference between nodes, a pulse width of the first gate signal SCAN1 may be adjusted. Within a first delay time I31, after the voltage of the second gate signal SCAN2 is inverted to the gate-off voltage VGL, the voltage of the first gate signal SCAN1 may be inverted to the gate-on voltage VGH. Within the third period I3, the voltage of the first gate signal SCAN1 may maintain the gate-on voltage VGH for as long as a pulse width section I32. Within a second delay time I33, after the voltage of the first gate signal SCAN1 is inverted to the gate-off voltage VGL, the voltage of the third gate signal EM1 may be inverted to the gate-on voltage VGH. The second delay time I33 may be set longer than the first delay time I31.

Figure 10:
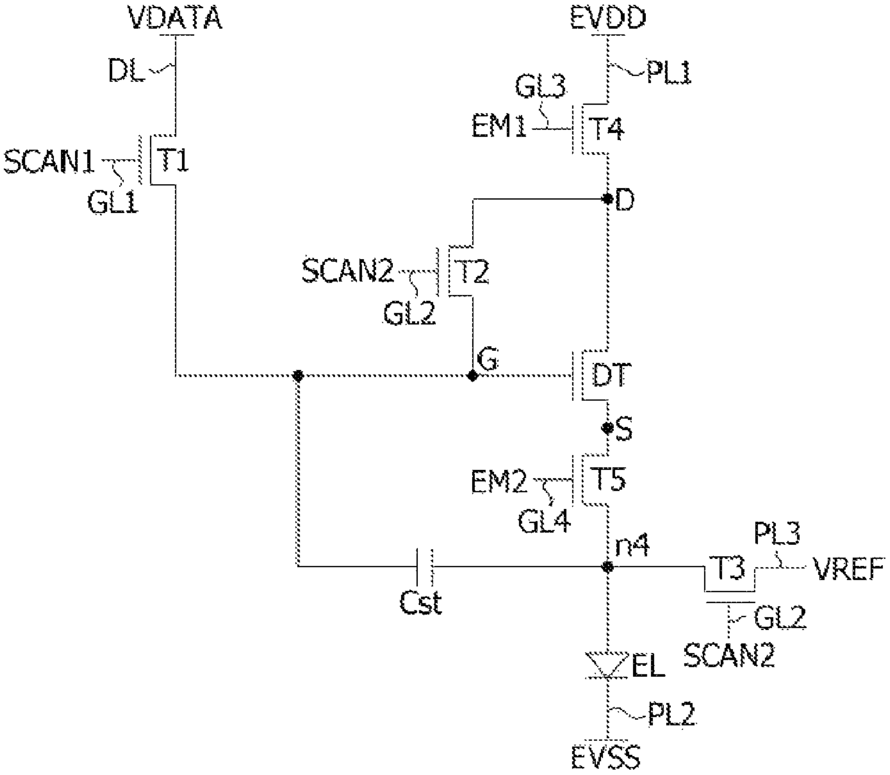
FIG. 10 is a circuit diagram showing a pixel circuit according to a fourth embodiment of the present disclosure.
Figure 11:
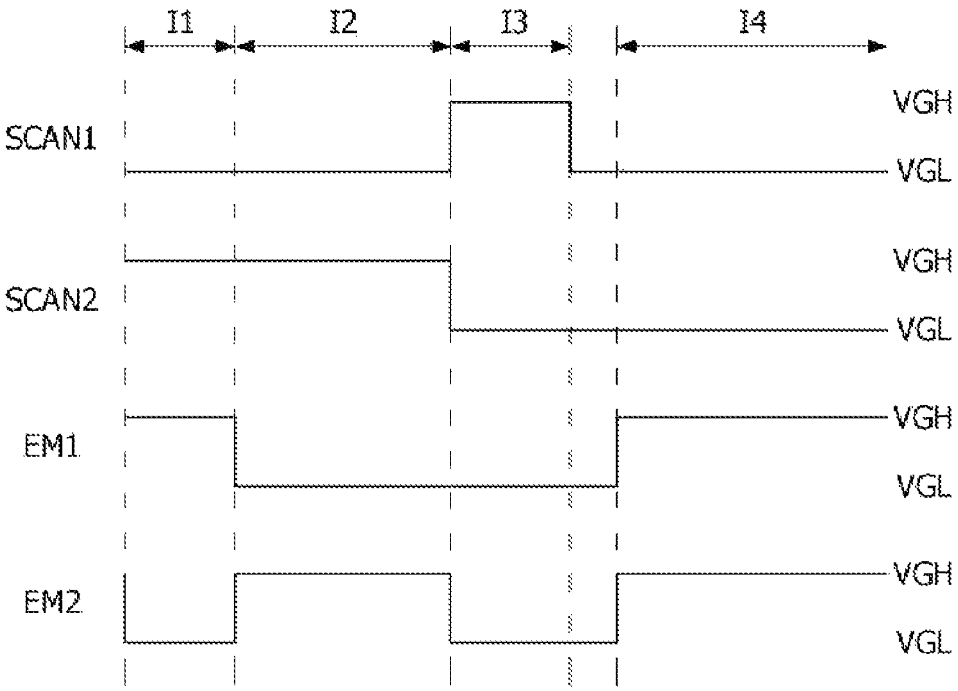
FIG. 11 are a waveform diagram showing waveforms of gate signals applied to the pixel circuit shown in FIG. 10.

FIG. 10 is a circuit diagram showing a pixel circuit according to a fourth embodiment of the present disclosure. FIG. 11 is a waveform diagram showing waveforms of gate signals applied to the pixel circuit shown in FIG. 10. In this embodiment, the components that are substantially the same as in the above-described embodiments are designated by the same reference numerals and a detailed description thereof will be omitted.

Referring to FIGS. 10 and 11, the pixel circuit includes a light emitting element EL, a driving element DT for driving the light emitting element EL, a plurality of switch elements T1 to T5, and a capacitor Cst. The driving element DT and the switch elements T1 to T5 may be implemented with n-channel oxide TFTs.

The pixel circuit is connected to a data line DL to which a data voltage VDATA is applied and gate lines GL1 to GL4 to which gate signals SCAN1, SCAN2, EM1, and EM2 are applied. The gate signals SCAN1, SCAN2, EM1, and EM2 include a first gate signal SCAN1, a second gate signal SCAN2, a third gate signal EM1, and a fourth gate signal EM2.

The driving period of the pixel circuit may be divided into first to fourth periods I1 to I4. The first to fourth periods I1 to I4 may be defined by waveforms of the gate signals SCAN1, SCAN2, EM1, and EM2. A floating period in which the voltages of the gate signals SCAN1, SCAN2, EM1, and EM2 are the gate-off voltage VGL may be set between the third period I3 and the fourth period I4.

The voltage of the first gate signal SCAN1 is generated as a pulse of the gate-on voltage VGH synchronized with the data voltage VDATA of the pixel data during the third period I3, and is the gate-off voltage VGL during the other periods I1, I2, and I4 other than the third period I3. The first switch element T1 is turned on in response to the gate-on voltage VGH of the first gate signal SCAN1.

The voltage of the second gate signal SCAN2 is the gate-on voltage VGH during the first and second periods I1 and I2, and is the gate-off voltage VGL during the third and fourth periods I3 and I4. The second and third switch elements T2 and T3 are turned on in response to the gate-on voltage VGH of the second gate signal SCAN2.

The voltage of the third gate signal EM1 is the gate-on voltage VGH during the first and fourth periods I1 and I4, and is the gate-off voltage VGL during the second and third periods I2 and I3. The fourth switch element T4 is turned on in response to the gate-on voltage VGH of the third gate signal EM1.

The voltage of the fourth gate signal EM2 is the gate-on voltage VGH during the second and fourth periods I2 and I4, and is the gate-off voltage VGL during the first and third periods I1 and I3. The fifth switch element T5 is turned on in response to the gate-on voltage VGH of the fourth gate signal EM2.

The fifth switch element T5 may block a current path between the third node S and the fourth node n4 during the first and third periods I1 and I3 to improve power consumption by blocking the current flowing to the light emitting element EL. In addition, the fifth switch element T5 may block the current path between the third node S and the fourth node n4 during the first and third periods I1 and I3, and when a ripple of the cathode voltage EVSS is generated, a ripple influence in which the voltages of the main nodes G and S are varied due to this ripple component may be reduced.

The driving element DT includes a first electrode connected to the first node D, a gate electrode connected to the second node G, and a second electrode connected to the third node S. The anode electrode of the light emitting element EL is connected to the fourth node n4, and the cathode electrode is connected to the second constant voltage node PL2 to which the cathode voltage EVSS is applied. A capacitor Coled, which is omitted from the drawing, may be formed between the anode electrode and the cathode electrode of the light emitting element EL. The capacitor Cst is connected between the second node G and the third node S.

The third switch element T3 is turned on in response to the gate-on voltage VGH of the second gate signal SCAN2 during the first and second periods I1 and I2. When the third switch element T3 is turned on, the reference voltage VREF is applied to the fourth node n4. The third switch element T3 is in an off-state during the third and fourth periods I3 and I4. The third switch element T3 includes a first electrode connected to the fourth node n4, a gate electrode connected to the second gate line GL2 to which the second gate signal SCAN2 is applied, and a second electrode connected to the third constant voltage node PL3 to which the reference voltage VREF is applied.

The fifth switch element T5 is turned on in response to the fourth gate signal EM2 generated as the gate-on voltage VGH during the second and fourth periods I2 and I4. When the fifth switch element T5 is turned on, the third node S is connected to the fourth node n4. The fifth switch element T5 is in an off-state during the first and third periods I1 and I3. The fifth switch element T5 includes a first electrode connected to the third node S, a gate electrode connected to the fourth gate line GL4 to which the fourth gate signal EM2 is applied, and a second electrode connected to the fourth node n4.

FIG. 12A to 15B are diagrams gradationally showing a driving period of the pixel circuit shown in FIG. 10.

Figure 12A:
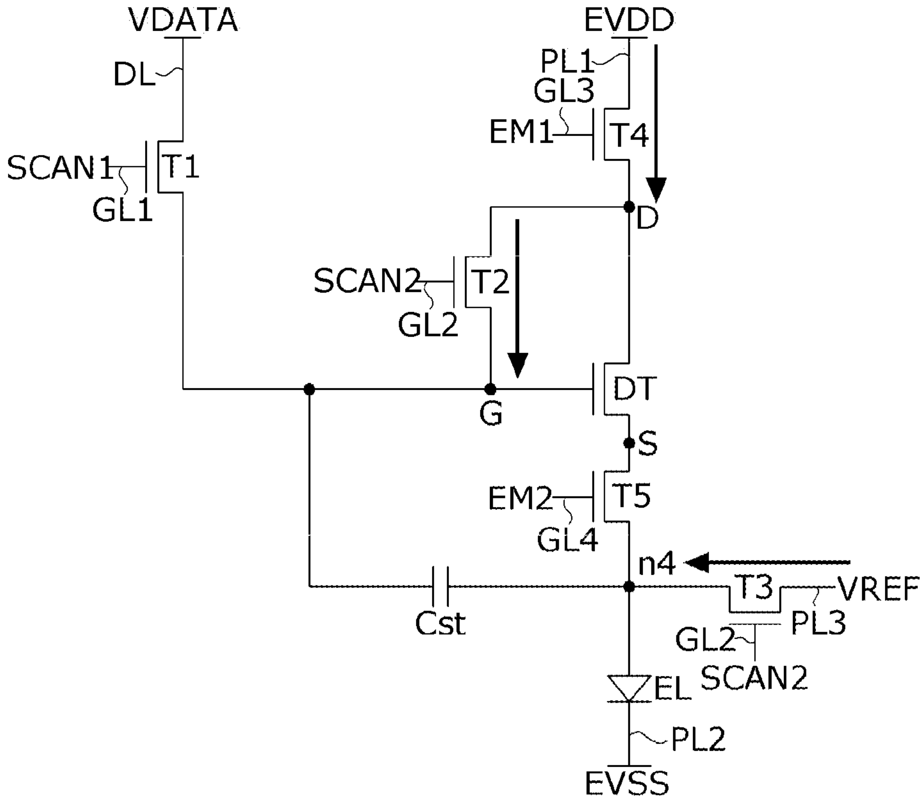
FIGS. 12A, 12B, 13A, 13B, 14A, 14B, 15A and 15B are circuit and timing diagrams showing a driving period of the pixel circuit shown in FIG. 10 at different times during operation.
Figure 12B:
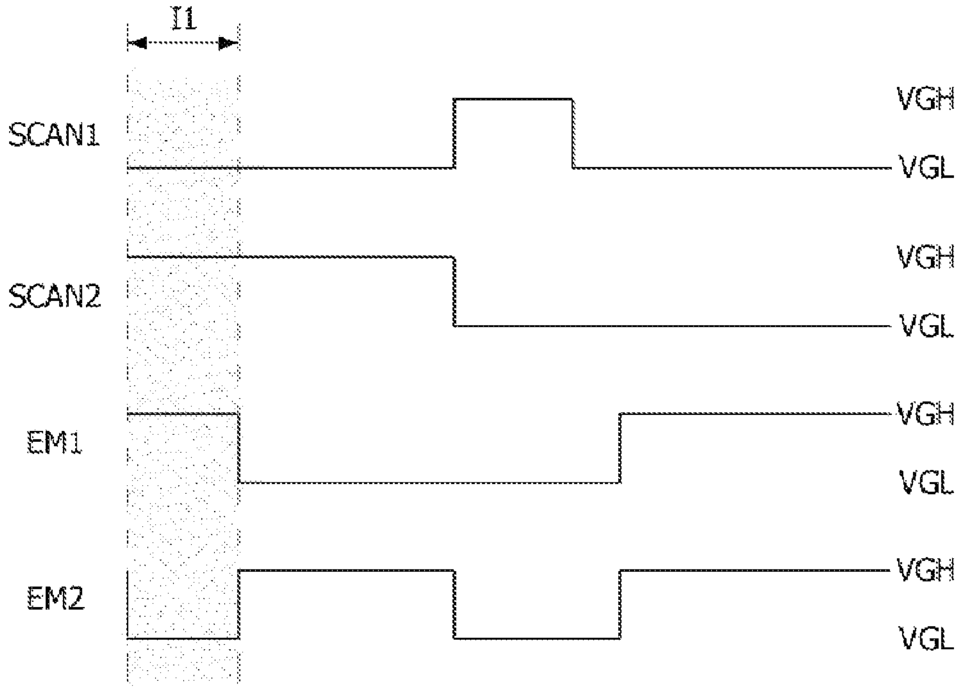

FIG. 12A is a circuit diagram showing a current flowing in a pixel circuit during a first period I1. FIG. 12B is a waveform diagram showing gate signals SCAN1, SCAN2, EM1, and EM2 during the first period I1.

Referring to FIGS. 12A and 12B, main nodes of the pixel circuit are initialized during the first period I1. During the first period I1, the voltages of the second and third gate signals SCAN2 and EM1 are the gate-on voltage VGH. During the first period I1, the voltages of the first and fourth gate signals SCAN1 and EM2 are the gate-off voltage VGL. Therefore, during the first period I1, the second, third, and fourth switch elements T2, T3, and T4 are turned on, and the first and fifth switch elements T1, T5 are turned off. At the end of the first period I1, the voltage of the second node G is the pixel driving voltage EVDD, and the voltage of the fourth node n4 and the anode voltage of the light emitting element EL are the reference voltage VREF. At the end of the first period I1, the voltage of the capacitor Cst and the gate-source voltage Vgs of the driving element DT are EVDD-VREF.

Figure 13A:
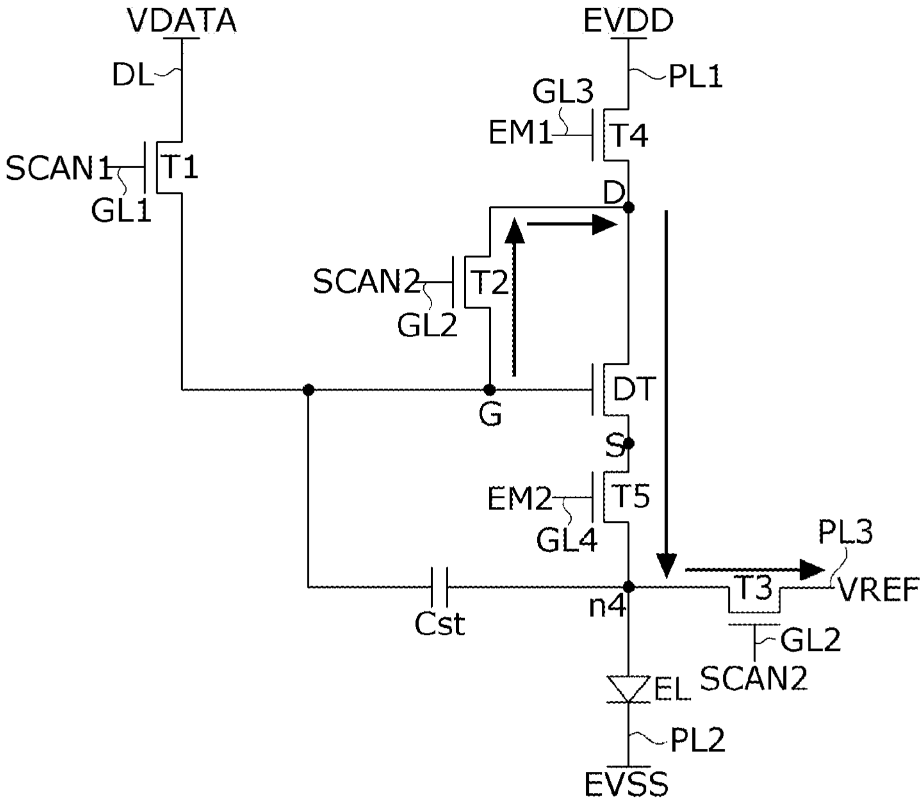
Figure 13B:
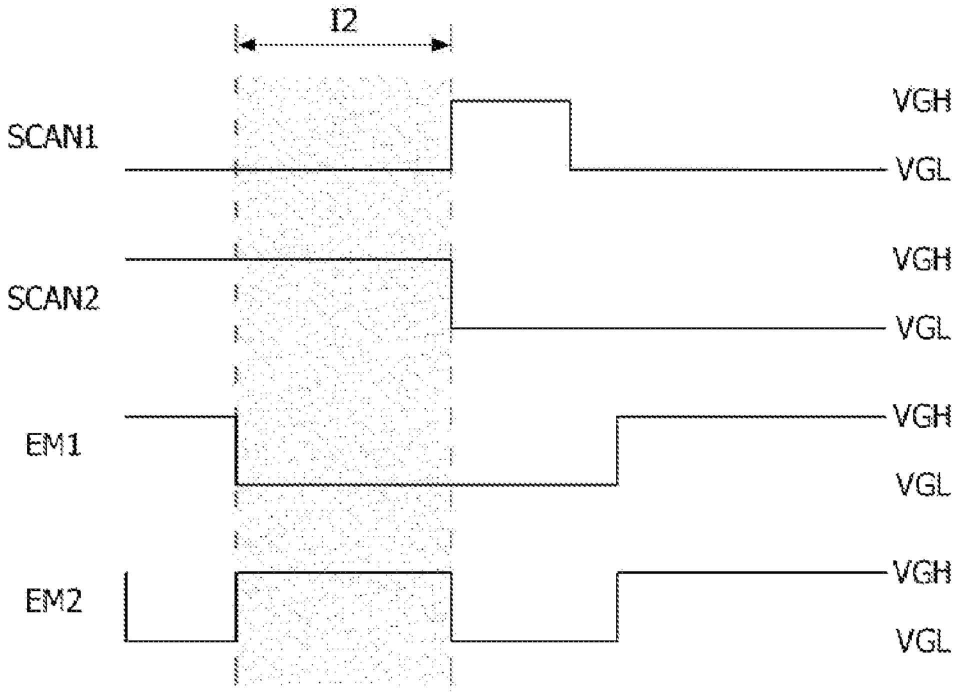

FIG. 13A is a circuit diagram showing a current flowing in the pixel circuit during the second period I2. FIG. 13B is a waveform diagram showing gate signals SCAN1, SCAN2, EM1, and EM2 during the second period I2.

Referring to FIGS. 13A and 13B, a threshold voltage Vth of the driving element DT is stored in the capacitor Cst during the second period I2. During the second period I2, the voltages of the second and fourth gate signals SCAN2 and EM2 are the gate-on voltage VGH, and the voltages of the first and third gate signals SCAN1 and EM1 are the gate-off voltage VGL. During the second period I2, the second, third and fifth switch elements T2, T3 and T5 and the driving element DT are turned on, and the first and fourth switch elements T1 and T4 is turned off. At the end of the second period I2, the voltage of the second node G is VREF+Vth, and the voltage of the fourth node n4 and the anode voltage of the light emitting element EL are the reference voltage VREF. Here, "Vth" is the threshold voltage of the driving element DT. At the end of the second period I2, the gate-source voltage Vgs of the driving element DT reaches the threshold voltage Vth, so the driving element DT is turned off, and the voltage of the capacitor Cst and the gate-source voltage Vgs of the driving element DT are the threshold voltage Vth.

Figure 14A:
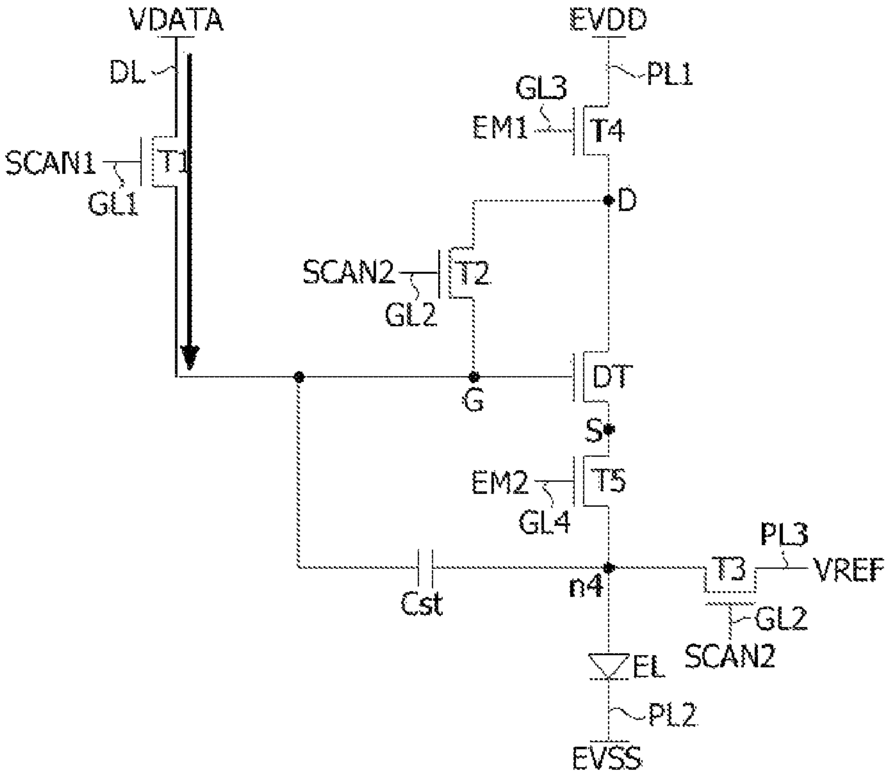
Figure 14B:
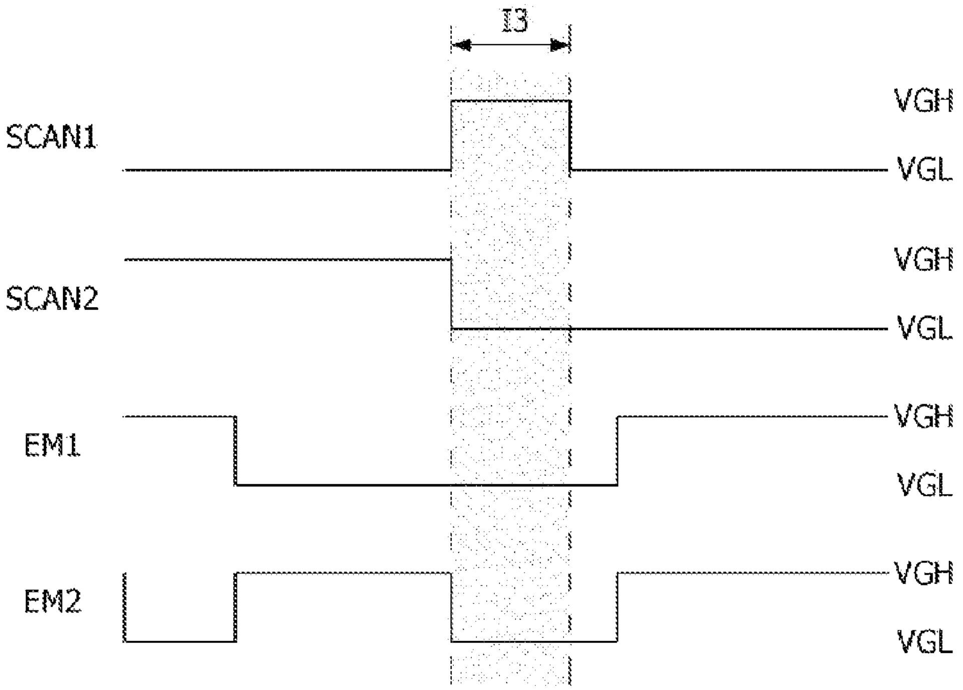

FIG. 14A is a circuit diagram showing a current flowing in the pixel circuit during the third period I3. FIG. 14B is a waveform diagram showing gate signals SCAN1, SCAN2, EM1, and EM2 during the third period I3.

Referring to FIGS. 14A and 14B, the data voltage VDATA of pixel data is applied to the second node G during the third period I3. During the third period I3, the voltage of the first gate signal SCAN1 is the gate-on voltage VGH, and the voltages of the second to fourth gate signals SCAN2, EM1, and EM2 are the gate-off voltage VGL. During the third period I3, the first switch element T1 is turned on, and the second to fifth switch elements T2, T3, T4, and T5 are turned off. At the end of the third period I3, the voltage of the second node G is the data voltage VDATA, and the voltage of the fourth node n4 and the anode voltage of the light emitting element EL are VDATA−(Vth+VDATA*C'). Here, C'=1−Cst/(Cst+Coled). Accordingly, at the end of the third period I3, the voltage of the capacitor Cst and the gate-source voltage Vgs of the driving element DT are Vth+VDATA*C'.

Figure 15A:
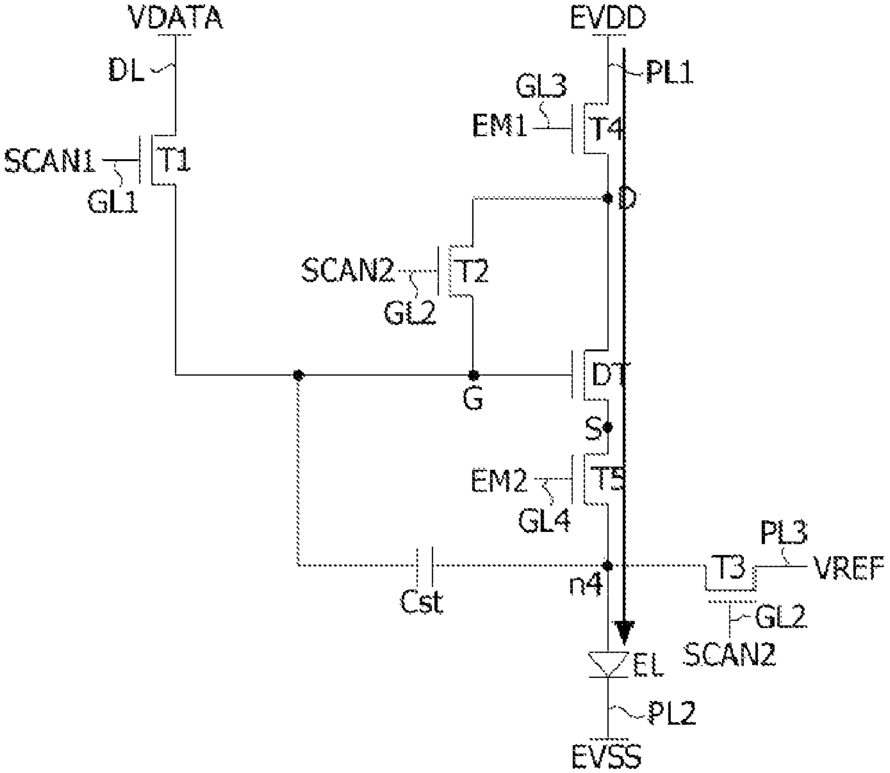
Figure 15B:
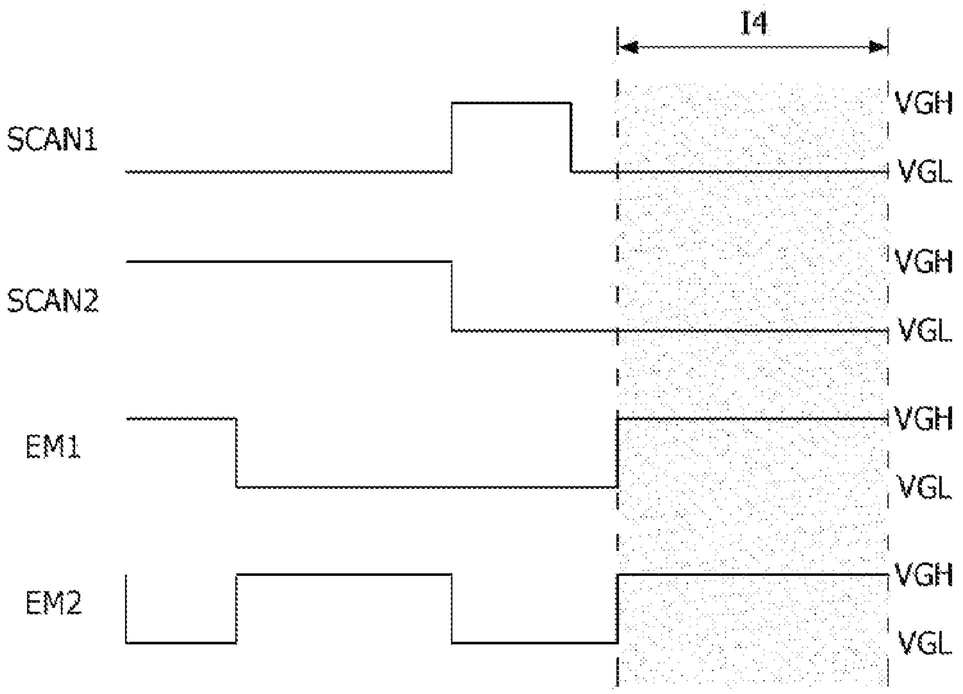

FIG. 15A is a circuit diagram showing a current flowing in the pixel circuit during the fourth period I4. FIG. 15B is a waveform diagram showing gate signals SCAN1, SCAN2, EM1, and EM2 during the fourth period I4.

Referring to FIGS. 15A and 15B, during the fourth period I4, the driving element DT generates a current depending on the gate-source voltage Vgs to drive the light emitting element EL. The light emitting element EL may emit light with a luminance corresponding to a grayscale value of pixel data by the current flowing through the driving element DT. During the fourth period I4, the voltages of the third and fourth gate signals EM1 and EM2 are the gate-on voltage VGH, and the voltages of the first and second gate signals SCAN1 and SCAN2 are gate-off voltage VGL. During the fourth period I4, the fourth and fifth switch elements T4 and T5 are turned on, and the first to third switch elements T1 to T3 are turned off. During the fourth period I4, the voltage of the fourth node n4 and the anode voltage of the light emitting element EL are voltages (Voled) determined depending on the current supplied through the driving element DT. During the fourth period I4, the voltage of the second node G is Voled+Vth+VDATA*C'. Therefore, during the fourth period I4, the voltage of the capacitor Cst and the gate-source voltage Vgs of the driving element DT are Vth+VDATA*C'.

Figure 16:
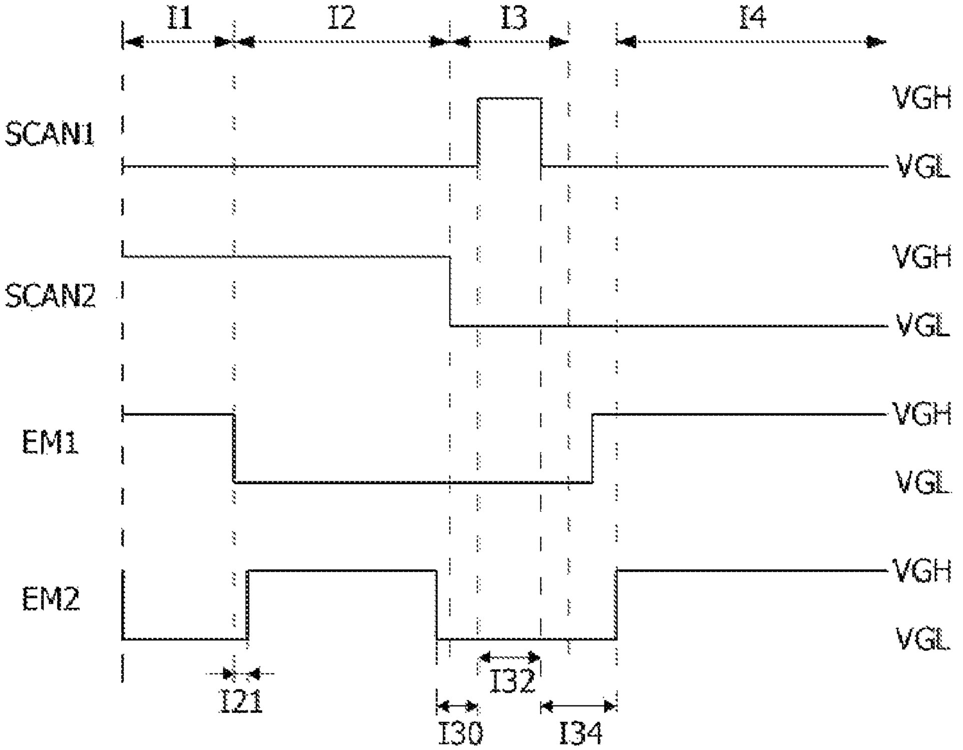
FIG. 16 is a waveform diagram showing other waveforms of gate signals applied to the pixel circuit shown in FIG. 10.

FIG. 16 is a waveform diagram showing other waveforms of gate signals applied to the pixel circuit shown in FIG. 10.

Referring to FIG. 16, a predetermined delay time I21 may be set between a falling edge of the third gate signal EM1 and a rising edge of the fourth gate signal EM2 so that the fourth and fifth switch elements T4 and T5 are not simultaneously switched between the first period I1 and the second period I2. After the voltage of the third gate signal EM1 is inverted to the gate-off voltage VGL within the delay time I21, the voltage of the fourth gate signal EM2 may be inverted to the gate-on voltage VGH.

At the end of the second period I2 in which the threshold voltage Vth of the driving element DT is sensed, the fourth gate signal EM2 is inverted to the gate-off voltage VGL before the second gate signal SCAN2 is inverted to the gate-off voltage VGL within the delay time I30 set between the second period I2 and the third period I3. Accordingly, it is possible to prevent voltage fluctuations of the capacitor Cst that may occur when the second and fifth switch elements T2 and T5 are simultaneously turned off.

In order to prevent voltage fluctuations of the main nodes due to on/off interference of the switch elements when the data voltage is applied in the third period I3, the fourth gate signal EM2 is inverted to the gate-off voltage VGL before the second gate signal SCAN2 is inverted to the gate-off voltage VGL within the delay time I30. After the second gate signal SCAN2 is inverted to the gate-off voltage VGL within the delay time I30, the first gate signal SCAN1 is inverted to the gate-on voltage VGH. During the third period I3, the voltage of the first gate signal SCAN1 maintains the gate-on voltage VGH for as long as a pulse width section I32. A delay time I34 between the third period I3 and the fourth period I4 may be set. Within this delay time I34, the third gate signal EM1 may be inverted to the gate-on voltage VGH after the first gate signal SCAN1 is inverted to the gate-off voltage VGL.

After the data voltage VDATA is charged in the capacitor Cst in the third period I3, the voltages of the second and third nodes G and S are boosted until the capacitor Coled of the light emitting element EL is charged, and then the light emitting element EL may emit light in the fourth period I4. In order to minimize the boosting time, after the third gate signal EM1 is inverted to the gate-on voltage VGH within the delay time I34 between the third period I3 and the fourth period I4, the fourth gate Signal EM2 may be inverted to the gate-on voltage VGH.

Figure 17:
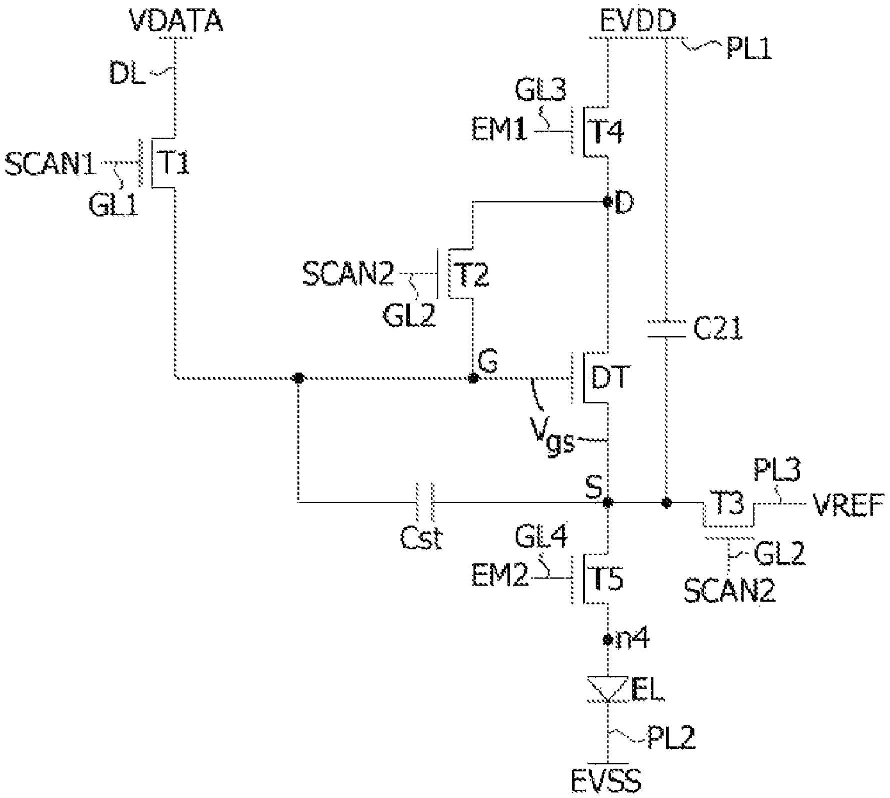
FIG. 17 is a circuit diagram showing a pixel circuit according to a fifth embodiment of the present disclosure.
Figure 18:
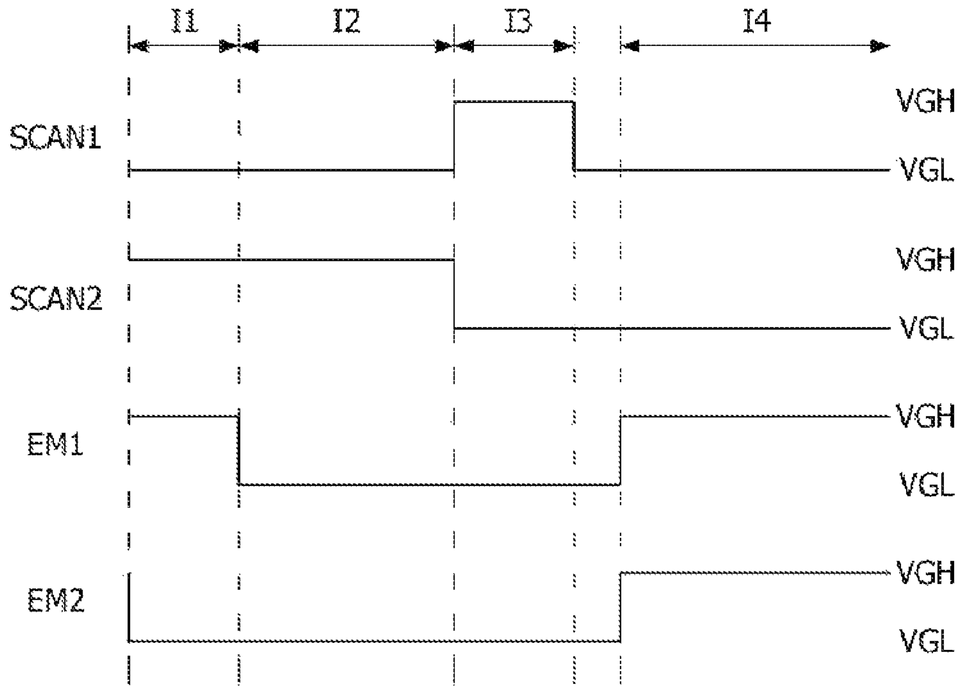
FIG. 18 are a waveform diagram showing waveforms of gate signals applied to the pixel circuit shown in FIG. 17.

FIG. 17 is a circuit diagram showing a pixel circuit according to a fifth embodiment of the present disclosure. FIG. 18 is a waveform diagram showing waveforms of gate signals applied to the pixel circuit shown in FIG. 17. In this embodiment, the components that are substantially the same as those of the pixel circuit shown in FIG. 10 are designated by the same reference numerals and a detailed description thereof will be omitted.

Referring to FIGS. 17 and 18, the pixel circuit includes a light emitting element EL, a driving element DT for driving the light emitting element EL, a plurality of switch elements T1 to T5, a first capacitor Cst, and a second capacitor C21.

The driving period of the pixel circuit may be divided into first to fourth periods I1 to I4. The first to fourth periods I1 to I4 may be defined by waveforms of the gate signals SCAN1, SCAN2, EM1, and EM2. A floating period in which the voltages of the gate signals SCAN1, SCAN2, EM1, and EM2 are the gate-off voltage VGL may be set between the third period I3 and the fourth period I4.

The voltage of the first gate signal SCAN1 is generated as a pulse of the gate-on voltage VGH synchronized with the data voltage VDATA of the pixel data during the third period I3, and is the gate-off voltage VGL during the other period I1, I2, and I4 other than the third period I3. The first switch element T1 is turned on in response to the gate-on voltage VGH of the first gate signal SCAN1.

The voltage of the second gate signal SCAN2 is the gate-on voltage VGH during the first and second periods I1 and I2, and is the gate-off voltage VGL during the third and fourth periods I3 and I4. The second and third switch elements T2 and T3 are turned on in response to the gate-on voltage VGH of the second gate signal SCAN2.

The voltage of the third gate signal EM1 is the gate-on voltage VGH during the first and fourth periods I1 and I4, and is the gate-off voltage VGL during the second and third periods I2 and I3. The fourth switch element T4 is turned on in response to the gate-on voltage VGH of the third gate signal EM1.

The voltage of the fourth gate signal EM2 is the gate-on voltage VGH during the fourth period I4 and is the gate-off voltage VGL during the first to third periods I1, I2, and I3. The fifth switch element T5 is turned on in response to the gate-on voltage VGH of the fourth gate signal EM2.

The fifth switch element T5 may block a current path between the third node S and the fourth node n4 during the first to third periods I1, I2, and I3 to improve power consumption by blocking the current flowing to the light emitting element EL, and when a ripple of the cathode voltage EVSS is generated, the ripple component affecting the main nodes G and S may be prevented.

The driving element DT includes a first electrode connected to the first node D, a gate electrode connected to the second node G, and a second electrode connected to the third node S. The anode electrode of the light emitting element EL is connected to the fourth node n4, and the cathode electrode is connected to the second constant voltage node PL2 to which the cathode voltage EVSS is applied. A capacitor Coled, which is omitted from the drawing, may be formed between the anode electrode and the cathode electrode of the light emitting element EL.

A first capacitor Cst is connected between the second node G and the third node S. A second capacitor C21 is connected between the first constant voltage node PL1 and the third node S. The second capacitor C21 increases transfer efficiency of the data voltage VDATA charged in the capacitor Cst.

The third switch element T3 is turned on in response to the gate-on voltage VGH of the second gate signal SCAN2 during the first and second periods I1 and I2. When the third switch element T3 is turned on, the reference voltage VREF is applied to the third node S. The third switch element T3 is in an off-state during the third and fourth periods I3 and I4. The third switch element T3 includes a first electrode connected to the third node S, a gate electrode connected to the second gate line GL2 to which the second gate signal SCAN2 is applied, and a second electrode connected to the third constant voltage node PL3 to which the reference voltage VREF is applied.

The fifth switch element T5 is turned on in response to the fourth gate signal EM2 generated as the gate-on voltage VGH during the fourth period I4. When the fifth switch element T5 is turned on, the third node S is connected to the fourth node n4. The fifth switch element T5 is in an off-state during the first to third periods I1, I2, and I3. The fifth switch element T5 includes a first electrode connected to the third node S, a gate electrode connected to the fourth gate line GL4 to which the fourth gate signal EM2 is applied, and a second electrode connected to the fourth node n4.

FIGS. 19A to 22B are diagrams gradationally showing a driving period of the pixel circuit shown in FIG. 17.

Figure 19A:
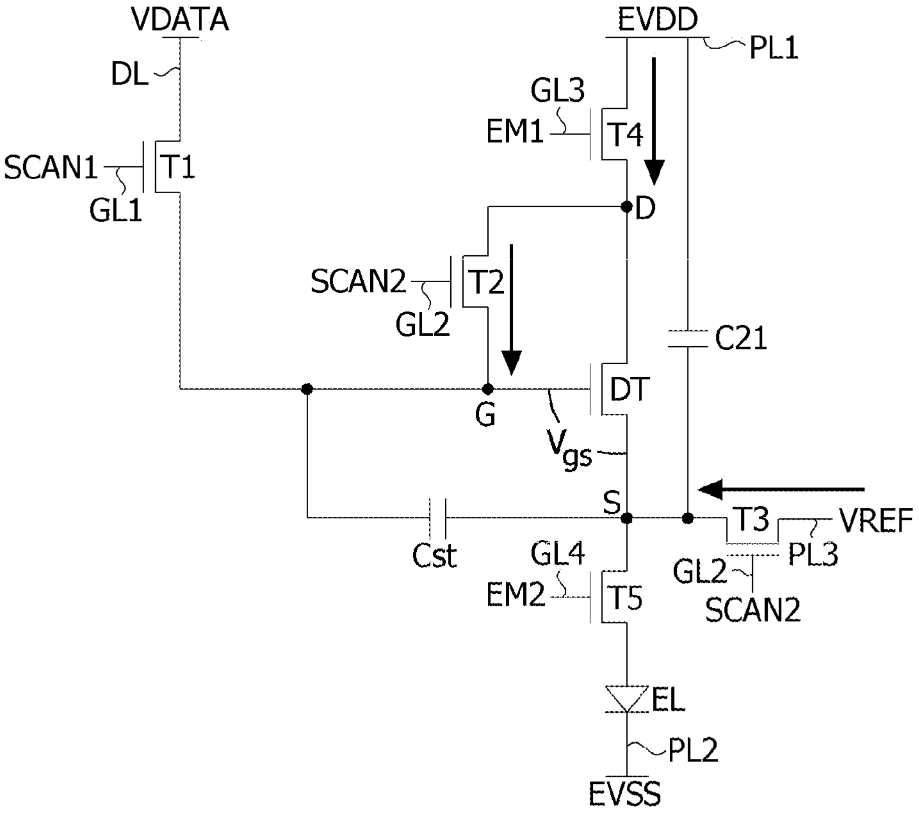
FIGS. 19A, 19B, 20A, 20B, 21A, 21B, 22A and 22B are circuit and timing diagrams showing a driving period of the pixel circuit shown in FIG. 17 at different times during operation.
Figure 19B:
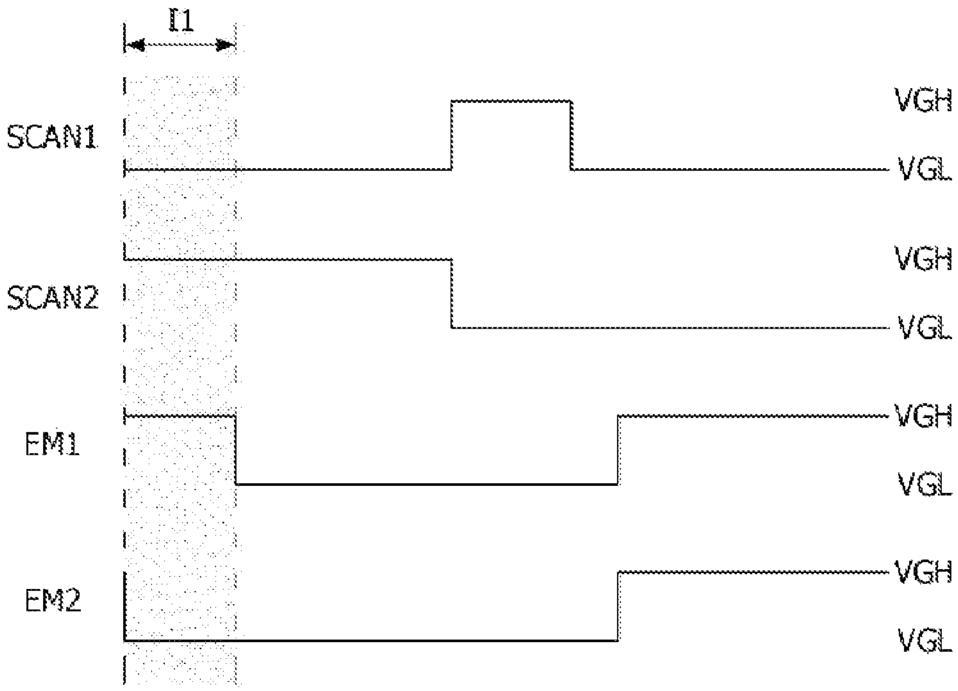

FIG. 19A is a circuit diagram showing a current flowing in a pixel circuit during a first period I1. FIG. 19B is a waveform diagram showing gate signals SCAN1, SCAN2, EM1, and EM2 during the first period I1.

Referring to FIGS. 19A and 19B, main nodes of the pixel circuit are initialized during the first period I1. During the first period I1, the voltages of the second and third gate signals SCAN2 and EM1 are the gate-on voltage VGH. During the first period I1, the voltages of the first and fourth gate signals SCAN1 and EM2 are the gate-off voltage VGL. Therefore, during the first period I1, the second, third, and fourth switch elements T2, T3, and T4 are turned on, and the first and fifth switch elements T1 and T5 are turned off. At the end of the first period I1, the voltage of the second node G is the pixel driving voltage EVDD, and the voltage of the third node S is the reference voltage VREF. At the end of the first period I1, the voltage of the capacitor Cst and the gate-source voltage Vgs of the driving element DT are EVDD-VREF.

Figure 20A:
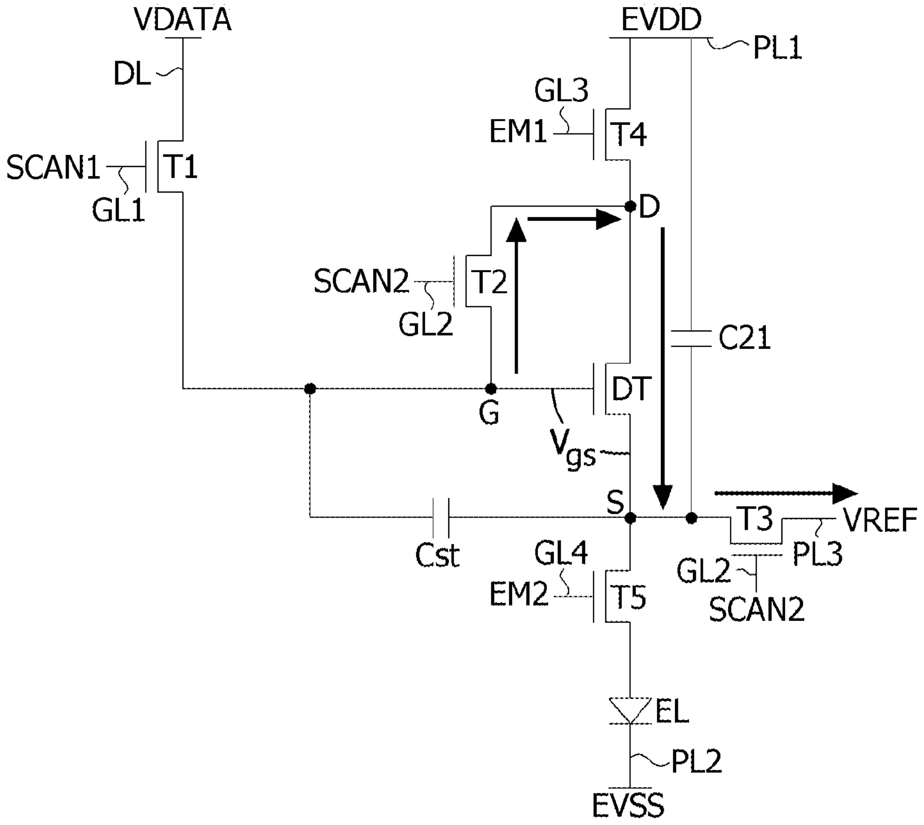
Figure 20B:
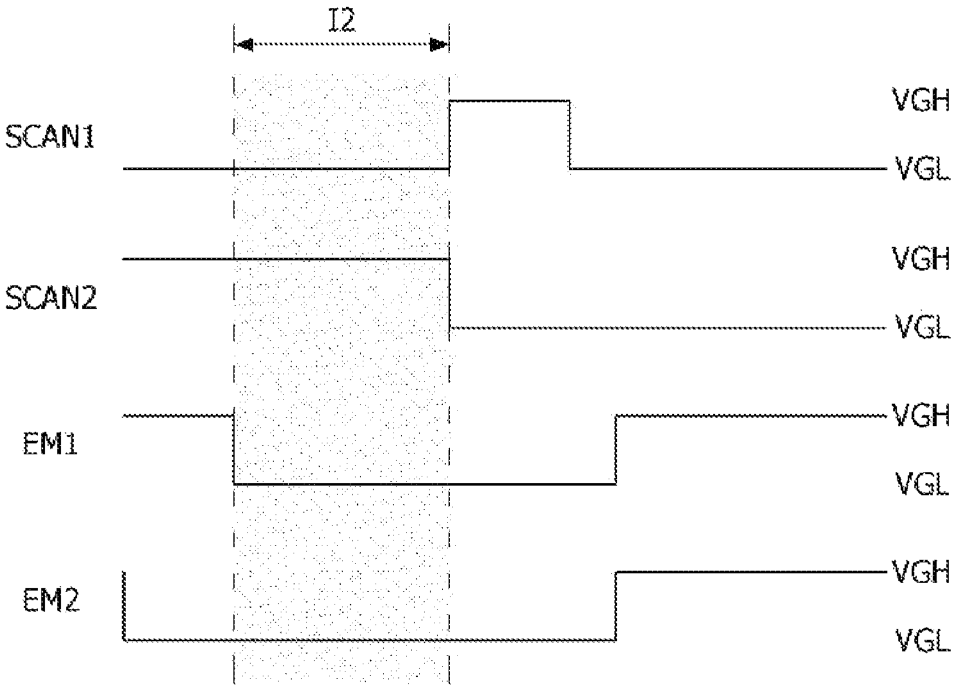

FIG. 20A is a circuit diagram showing a current flowing in a pixel circuit during a second period I2. FIG. 20B is a waveform diagram showing gate signals SCAN1, SCAN2, EM1, and EM2 during the second period I2.

Referring to FIGS. 20A and 20B, a threshold voltage Vth of the driving element DT is stored in the capacitor Cst during the second period I2. During the second period I2, the voltage of the second gate signal SCAN2 is the gate-on voltage VGH, and the voltages of the first, third, and fourth gate signals SCAN1, EM1, and EM2 are the gate-off voltage VGL. During the second period I2, the second and third switch elements T2 and T3 and the driving element DT are turned on, and the first, fourth and fifth switch elements T1, T4 and T5 are turned off. At the end of the second period I2, the voltage of the second node G is VREF+Vth, and the voltage of the third node S is the reference voltage VREF. Here, “Vth” is the threshold voltage of the driving element DT. At the end of the second period I2, the gate-source voltage Vgs of the driving element DT reaches the threshold voltage Vth, so the driving element DT is turned off, and the voltage of the capacitor Cst and the gate-source voltage Vgs of the driving element DT are the threshold voltage Vth.

Figure 21A:
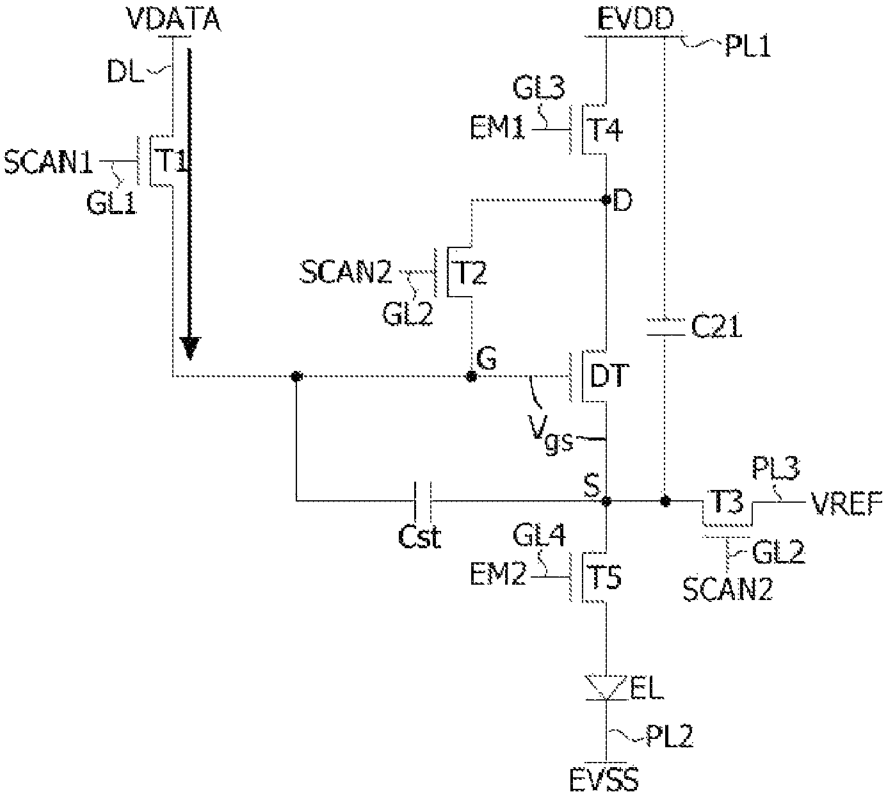
Figure 21B:
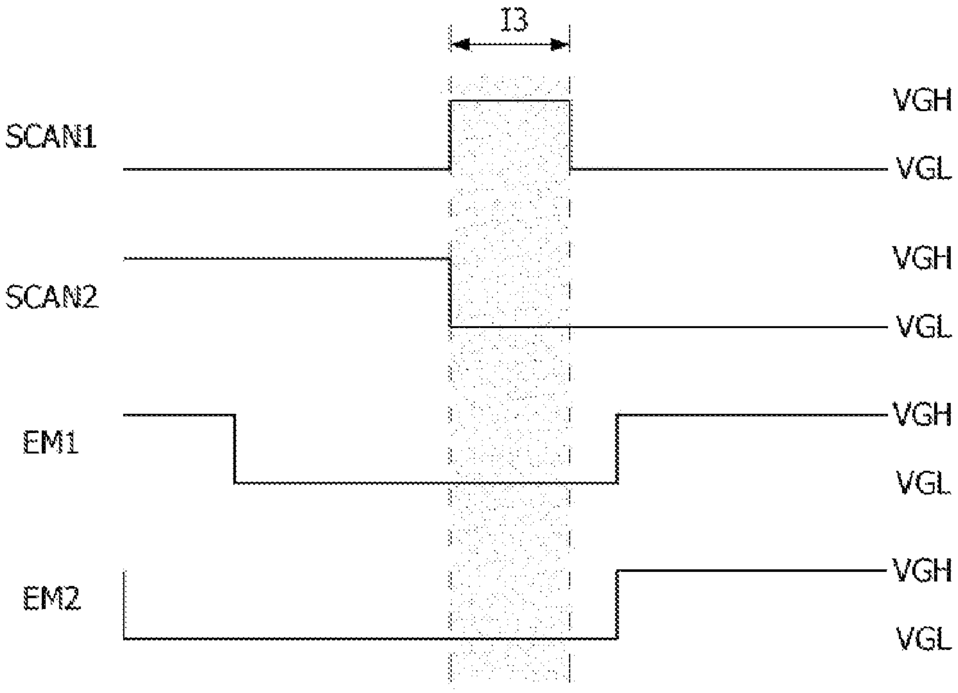

FIG. 21A is a circuit diagram showing a current flowing in the pixel circuit during a third period I3. FIG. 21B is a waveform diagram showing gate signals SCAN1, SCAN2, EM1, and EM2 during the third period I3.

Referring to FIGS. 21A and 21B, the data voltage VDATA of pixel data is applied to the second node G during the third period I3. During the third period I3, the voltage of the first gate signal SCAN1 is the gate-on voltage VGH, and the voltages of the second to fourth gate signals SCAN2, EM1, and EM2 are the gate-off voltage VGL. During the third period I3, the first switch element T1 is turned on, and the second to fifth switch elements T2, T3, T4, and T5 are turned off. At the end of the third period I3, the voltage of the second node G is the data voltage VDATA, and the voltage of the third node S is VDATA−(Vth+VDATA*C'). Here, C'=1−Cst/(Cst+Coled+C21). Accordingly, at the end of the third period I3, the voltage of the capacitor Cst and the gate-source voltage Vgs of the driving element DT are Vth+VDATA*C'.

Figure 22A:
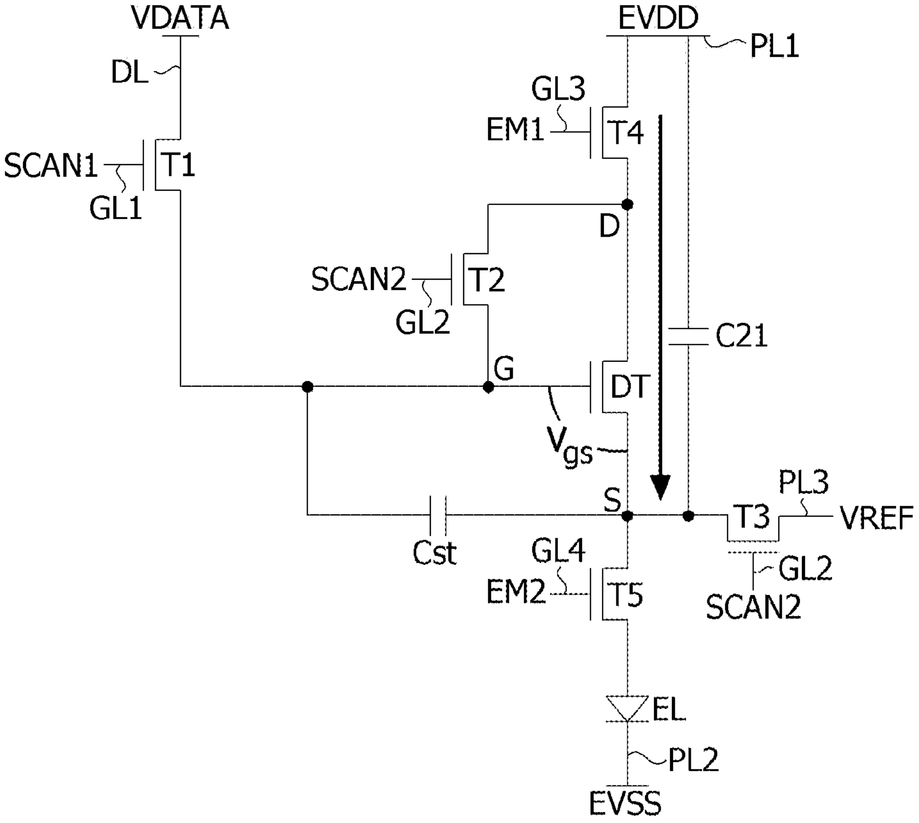
Figure 22B:
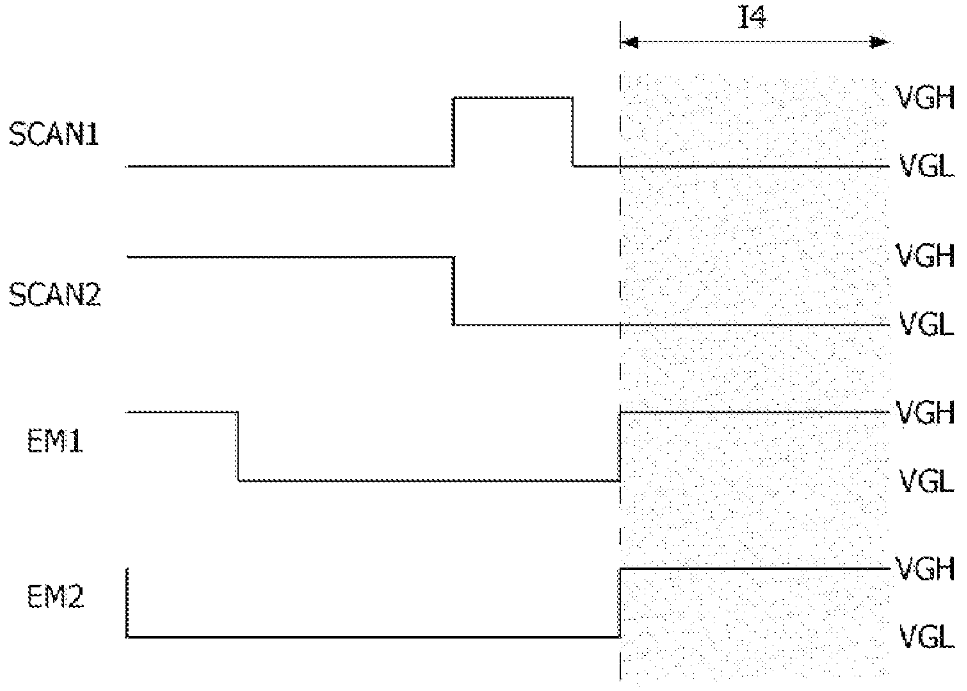

FIG. 22A is a circuit diagram showing a current flowing in a pixel circuit during a fourth period I4. FIG. 22B is a waveform diagram showing gate signals SCAN1, SCAN2, EM1, and EM2 during the fourth period I4.

Referring to FIGS. 22A and 22B, during the fourth period I4, the driving element DT generates a current depending on the gate-source voltage Vgs to drive the light emitting element EL. The light emitting element EL may emit light with a luminance corresponding to a grayscale value of pixel data by a current flowing through the driving element DT. During the fourth period I4, the voltages of the third and fourth gate signals EM1 and EM2 are the gate-on voltage VGH, and the voltages of the first and second gate signals SCAN1 and SCAN2 are the gate-off voltage VGL. During the fourth period I4, the fourth and fifth switch elements T4 and T5 are turned on, and the first to third switch elements T1 to T3 are turned off. During the fourth period I4, the voltage of the fourth node n4 and the anode voltage of the light emitting element EL are voltages (Voled) determined depending on the current supplied through the driving element DT. During the fourth period I4, the voltage of the second node G is Voled+Vth+VDATA*C'. Therefore, during the fourth period I4, the voltage of the capacitor Cst and the gate-source voltage Vgs of the driving element DT are Vth+VDATA*C'.

Figure 23:
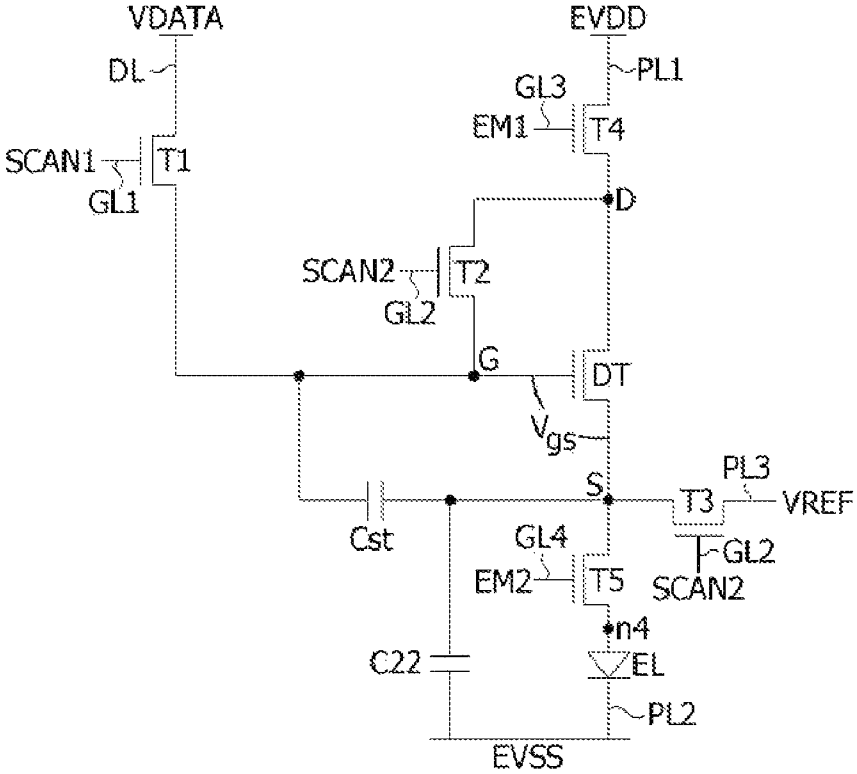
FIG. 23 is a circuit diagram showing a pixel circuit according to a sixth embodiment of the present disclosure.

FIG. 23 is a circuit diagram showing a pixel circuit according to a sixth embodiment of the present disclosure. The gate signals of FIG. 18 or 24 may be applied to the pixel circuits shown in FIG. 23. The driving period of the pixel circuits is divided into first to fourth periods I1 to I4, which are substantially the same as those of the fifth embodiment described above.

Referring to FIG. 23, the pixel circuit may further include a second capacitor C22. The second capacitor C22 may be connected between the third node S and the second constant voltage node PL2.

Figure 24:
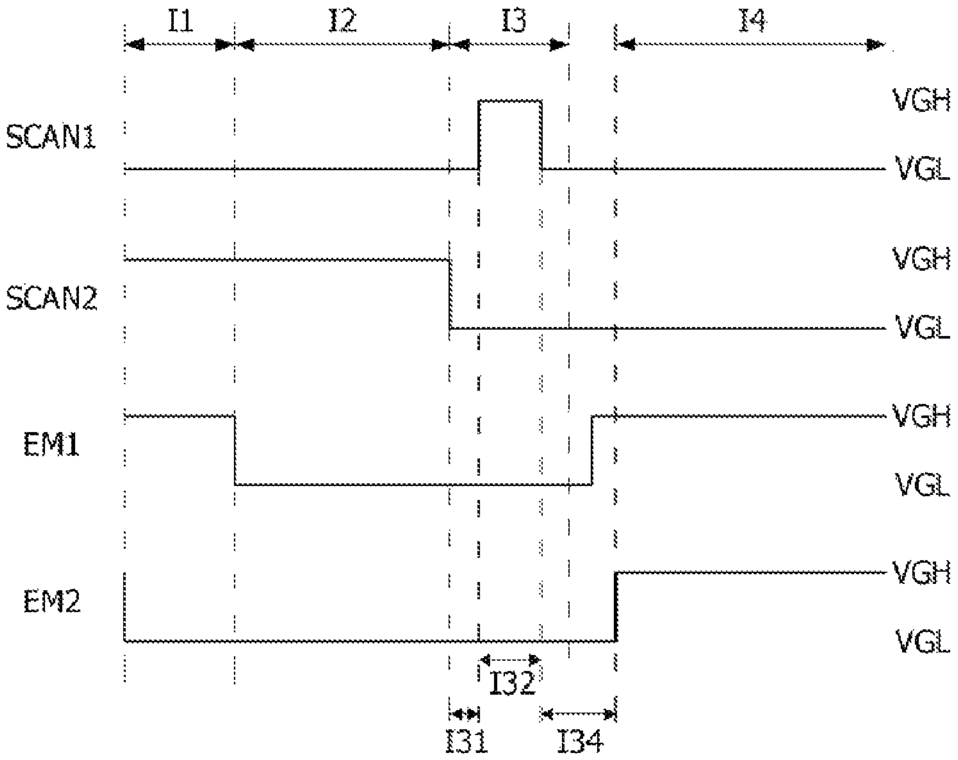
FIG. 24 is a waveform diagram showing other waveforms of gate signals applied to the pixel circuit shown in FIG. 17.

FIG. 24 is a waveform diagram showing other waveforms of gate signals applied to the pixel circuit shown in FIG. 17.

Referring to FIG. 24, at the end of the second period I2 in which the threshold voltage Vth of the driving element DT is sensed, in order to prevent on/off interference between the switch elements T1, T2, and T3, a delay time I31 may be set between the second period I2 and the third period I3. Within the delay time I31, the second gate signal SCAN2 is inverted to the gate-off voltage VGL before the first gate signal SCAN1 is inverted to the gate-on voltage VGH.

After the voltage of the first gate signal SCAN1 is maintained at the gate-on voltage VGH for as long as the pulse width section I32 in the third period I3, the delay time I34 may be set. Within the delay time I34, the third gate signal EM1 may be inverted to the gate-on voltage VGH after the first gate signal SCAN1 is inverted to the gate-off voltage VGL. After the third gate signal EM1 is inverted to the gate-on voltage VGH, the fourth gate signal EM2 may be inverted to the gate-on voltage VGH.

Figure 25:
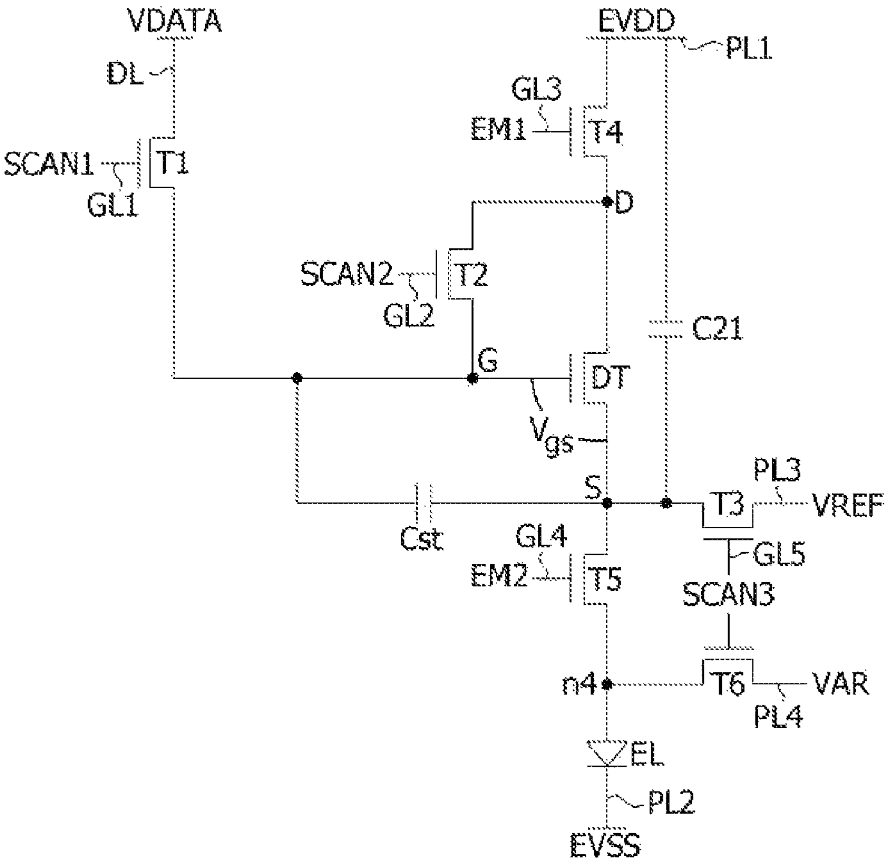
FIG. 25 is a circuit diagram showing a pixel circuit according to a seventh embodiment of the present disclosure.
Figure 26:
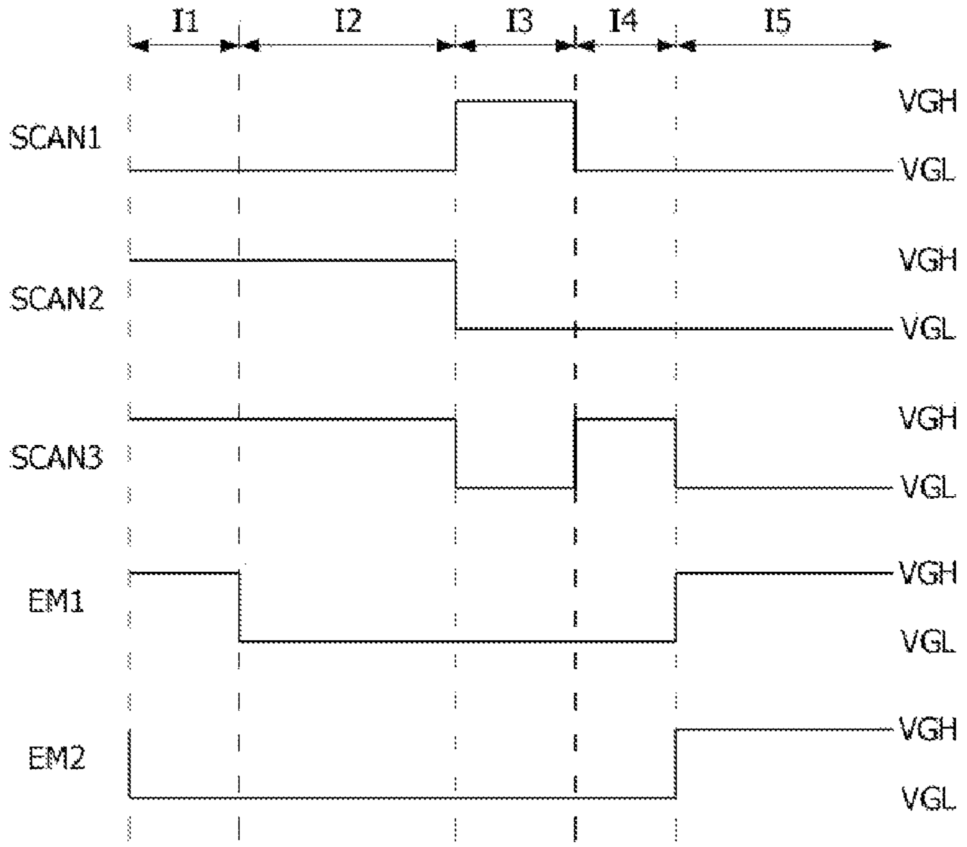
FIG. 26 are a waveform diagram showing waveforms of gate signals applied to the pixel circuit shown in FIG. 25.

FIG. 25 is a circuit diagram showing a pixel circuit according to a seventh embodiment of the present disclosure. FIG. 26 is a waveform diagram showing waveforms of gate signals applied to the pixel circuit shown in FIG. 25. In this embodiment, the components that are substantially the same as those of the pixel circuit shown in FIG. 17 are designated by the same reference numerals and a detailed description thereof will be omitted.

Referring to FIGS. 25 and 26, the pixel circuit includes a light emitting element EL, a driving element DT for driving the light emitting element EL, a plurality of switch elements T1 to T6, and a first capacitor Cst, and a second capacitor C21.

The driving period of the pixel circuit may be divided into first to fifth periods I1 to I5. The first to fifth periods I1 to I5 may be defined by waveforms of the gate signals SCAN1, SCAN2, SCAN3, EM1, and EM2.

A frame frequency of an input image may be lowered to a frequency of a low-speed driving mode condition. In the low-speed driving mode, the voltages of the third and fourth nodes S and n4 are discharged, so that the gate-source voltage Vgs of the driving element DT and the anode voltage of the light emitting element EL may be varied. During the fourth period I4, the reference voltage VREF is supplied to the third node S to suppress fluctuations of the gate-source voltage Vgs of the driving element DT, and a preset anode reset voltage VAR may be applied to the anode electrode of the light emitting element EL.

The anode reset voltage VAR is a voltage lower than the pixel driving voltage EVDD. When the driving frequency of pixels is varied, for example, in order to reduce a luminance difference between a low-speed driving mode and a high-frequency driving, the anode reset voltage VAR may be set to a voltage independent of the reference voltage VREF. The anode reset voltage VAR may be set to a voltage level different from that of the reference voltage VREF, and the voltage level may be varied depending on a hold time during which the data voltage is not written to the pixel circuit in the low-speed driving mode and a previous data voltage is maintained.

The voltage of the first gate signal SCAN1 is generated as a pulse of the gate-on voltage VGH synchronized with the data voltage VDATA of the pixel data during the third period I3, and is the gate-off voltage VGL during the other periods I1, I2, I4, and I5 other than the third period I3. The first switch element T1 is turned on in response to the gate-on voltage VGH of the first gate signal SCAN1.

The voltage of the second gate signal SCAN2 is the gate-on voltage VGH during the first and second periods I1 and I2, and is the gate-off voltage VGL during the third to fifth periods I3, I4, and I5. The second switch element T2 is turned on in response to the gate-on voltage VGH of the second gate signal SCAN2.

The voltage of the third gate signal EM1 is the gate-on voltage VGH during the first and fifth periods I1 and I5, and is the gate-off voltage VGL during the second, third and fourth periods I2, I3 and I4. The fourth switch element T4 is turned on in response to the gate-on voltage VGH of the third gate signal EM1.

The voltage of the fourth gate signal EM2 is the gate-on voltage VGH during the fifth period I5 and is the gate-off voltage VGL during the first to fourth periods I1 to I4. The fifth switch element T5 is turned on in response to the gate-on voltage VGH of the fourth gate signal EM2.

The voltage of the fifth gate signal SCAN3 is the gate-on voltage VGH during the first, second, and fourth periods I1, I2, and I4, and is the gate-off voltage VGL during the third and fifth periods I3 and I5. The third and sixth switch elements T3 and T6 are turned on in response to the gate-on voltage VGH of the fifth gate signal SCAN3.

The driving element DT includes a first electrode connected to the first node D, a gate electrode connected to the second node G, and a second electrode connected to the third node S. The anode electrode of the light emitting element EL is connected to the fourth node n4, and the cathode electrode is connected to the second constant voltage node PL2 to which the cathode voltage EVSS is applied. A capacitor Coled, which is omitted from the drawing, may be formed between the anode electrode and the cathode electrode of the light emitting element EL.

The first capacitor Cst is connected between the second node G and the third node S. The second capacitor C21 is connected between the first constant voltage node PL1 and the third node S.

The third switch element T3 is turned on in response to the gate-on voltage VGH of the fifth gate signal SCAN3 during the first, second, and fourth periods I1, I2, and I4. When the third switch element T3 is turned on, the reference voltage VREF is applied to the third node S. The third switch element T3 is in an off-state during the third and fifth periods I3 and I5. The third switch element T3 includes a first electrode connected to the third node S, a gate electrode connected to the fifth gate line GL5 to which the fifth gate signal SCAN3 is applied, and a second electrode connected to the third constant voltage node PL3 to which the reference voltage VREF is applied.

The sixth switch element T6 is turned on in response to the gate-on voltage VGH of the fifth gate signal SCAN3 during the first, second, and fourth periods I1, I2, and I4. When the sixth switch element T6 is turned on, the anode reset voltage VAR is applied to the fourth node n4. The sixth switch element T6 is in an off-state during the third and fifth periods I3 and I5. The sixth switch element T6 includes a first electrode connected to the fourth node n4, a gate electrode connected to the fifth gate line GL5 to which the fifth gate signal SCAN3 is applied, and a second electrode connected to the fourth constant voltage node PL4 to which the anode reset voltage VAR is applied.

FIGS. 27A to 30B are diagrams gradationally showing a driving period of the pixel circuit shown in FIG. 25.

Figure 27A:
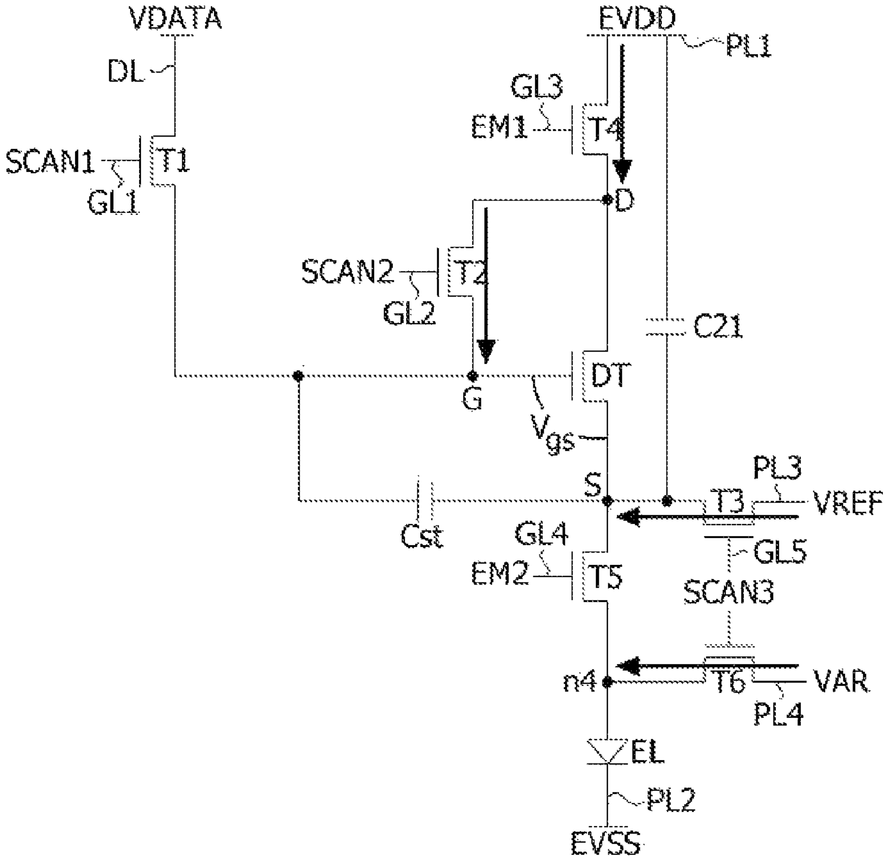
FIGS. 27A, 27B, 28A, 28B, 29A, 29B, 30A and 30B are circuit and timing diagrams showing a driving period of the pixel circuit shown in FIG. 25 at different times during operation.
Figure 27B:
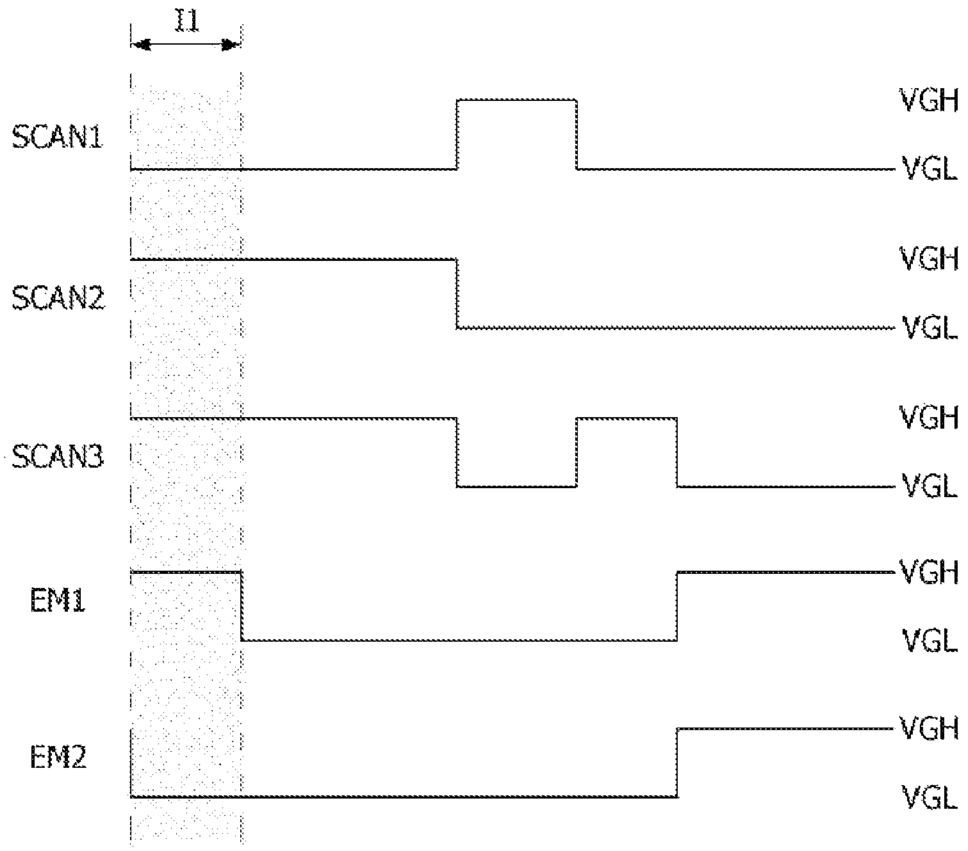

FIG. 27A is a circuit diagram showing a current flowing in the pixel circuit during the first period I1. FIG. 27B is a waveform diagram showing gate signals SCAN1, SCAN2, SCAN3, EM1, and EM2 during the first period I1.

Referring to FIGS. 27A and 27B, main nodes of the pixel circuit are initialized during the first period I1. During the first period I1, voltages of the second, third, and fifth gate signals SCAN2, EM1, and SCAN3 are gate-on voltage VGH. During the first period I1, the voltages of the first and fourth gate signals SCAN1 and EM2 are the gate-off voltage VGL. Therefore, during the first period I1, the second, third, fourth and sixth switch elements T2, T3, T4 and T6 are turned on, and the first and fifth switch elements T1 and T5 are turned off. At the end of the first period I1, the voltage of the second node G is the pixel driving voltage EVDD, the voltage of the third node S is the reference voltage VREF, and the voltage of the fourth node n4 is the anode reset voltage VAR. At the end of the first period I1, the voltage of the capacitor Cst and the gate-source voltage Vgs of the driving element DT are EVDD-VREF.

Figure 28A:
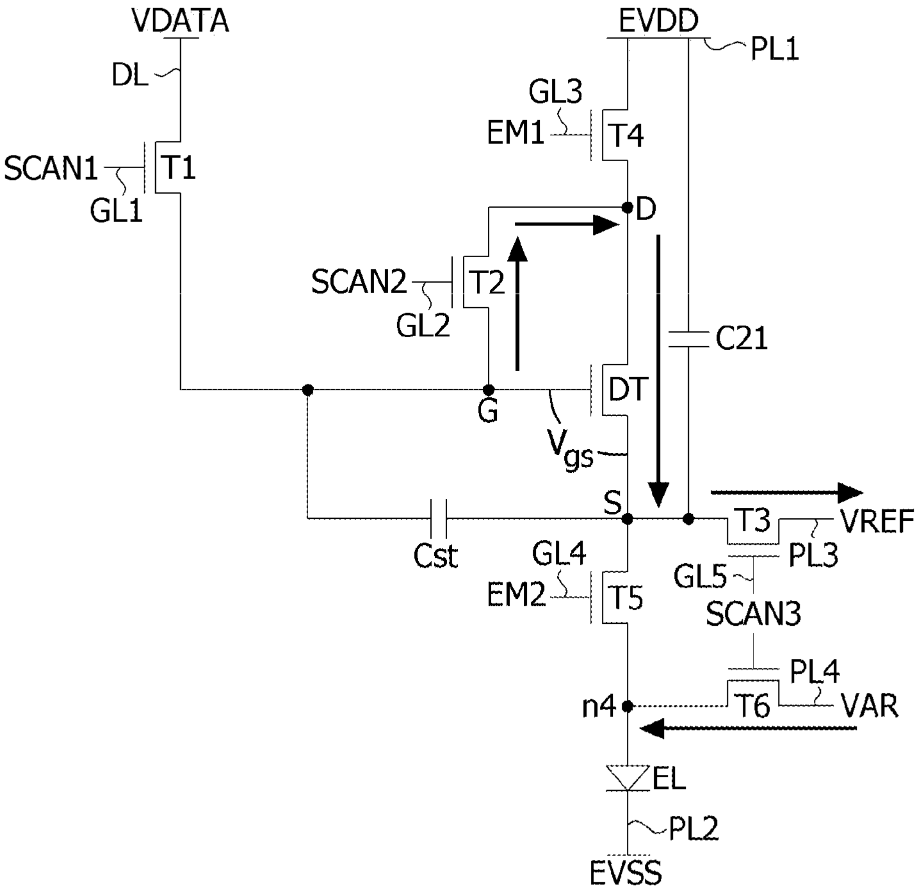
Figure 28B:
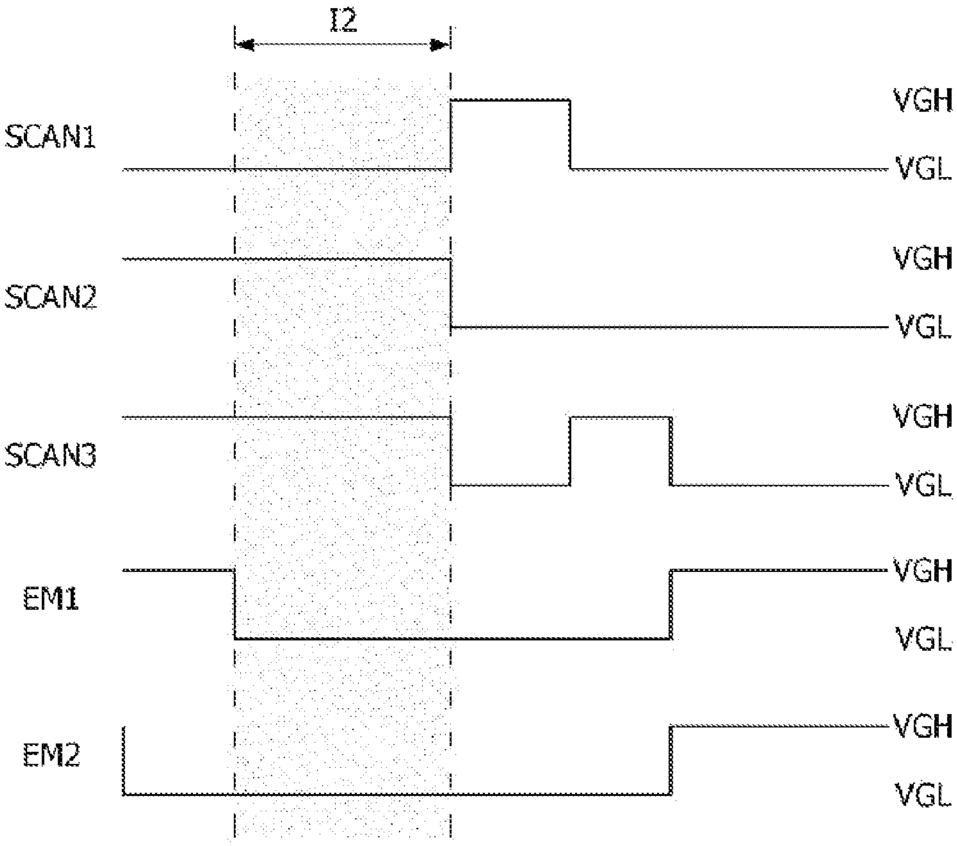

FIG. 28A is a circuit diagram showing a current flowing in the pixel circuit during the second period I2. FIG. 28B is a waveform diagram showing gate signals SCAN1, SCAN2, SCAN3, EM1, and EM2 during the second period I2.

Referring to FIGS. 28A and 28B, the threshold voltage Vth of the driving element DT is stored in the capacitor Cst during the second period I2. During the second period I2, voltages of the second and fifth gate signals SCAN2 and SCAN3 are the gate-on voltage VGH, and voltages of the first, third, and fourth gate signals SCAN1, EM1, and EM2 are the gate-off voltage VGL. During the second period I2, the second, third, and sixth switch elements T2, T3, and T6 and the driving element DT are turned on, and the first, fourth, and fifth switch elements T1, T4, T5 are turned off. At the end of the second period I2, the voltage of the second node G is VREF+Vth, the voltage of the third node S is the reference voltage VREF, and the voltage of the fourth node n4 is the anode reset voltage VAR. Here, "Vth" is the threshold voltage of the driving element DT. At the end of the second period I2, the gate-source voltage Vgs of the driving element DT reaches the threshold voltage Vth, so the driving element DT is turned off, and the voltage of the capacitor Cst and the gate-the source voltage Vgs of the driving element DT are the threshold voltage Vth.

Figure 29A:
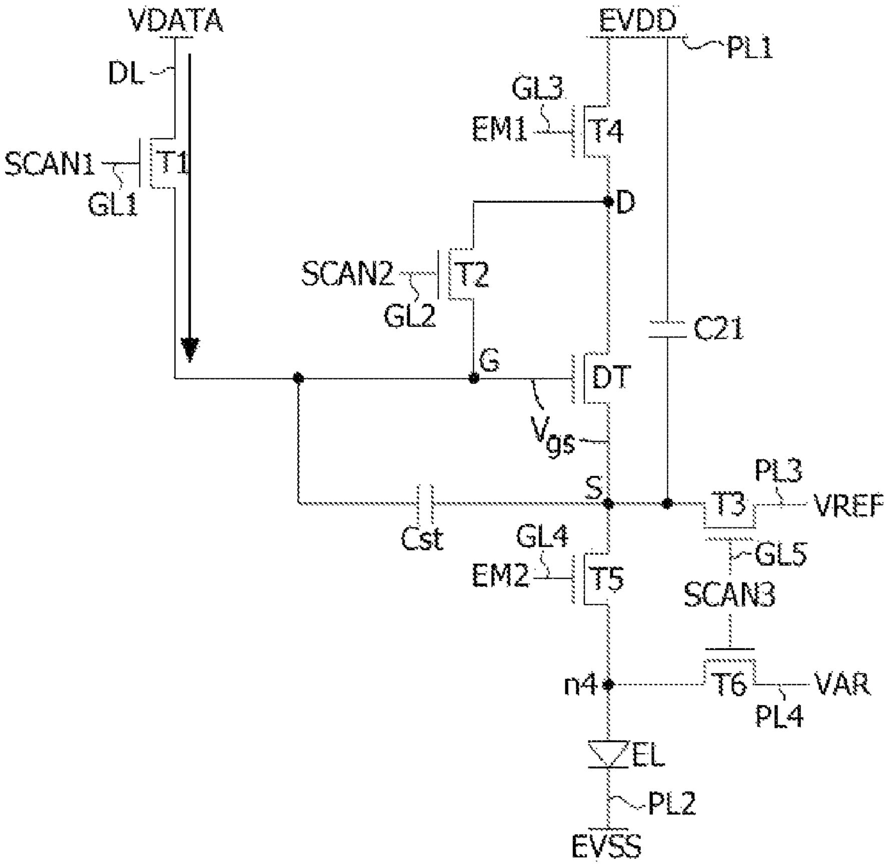
Figure 29B:
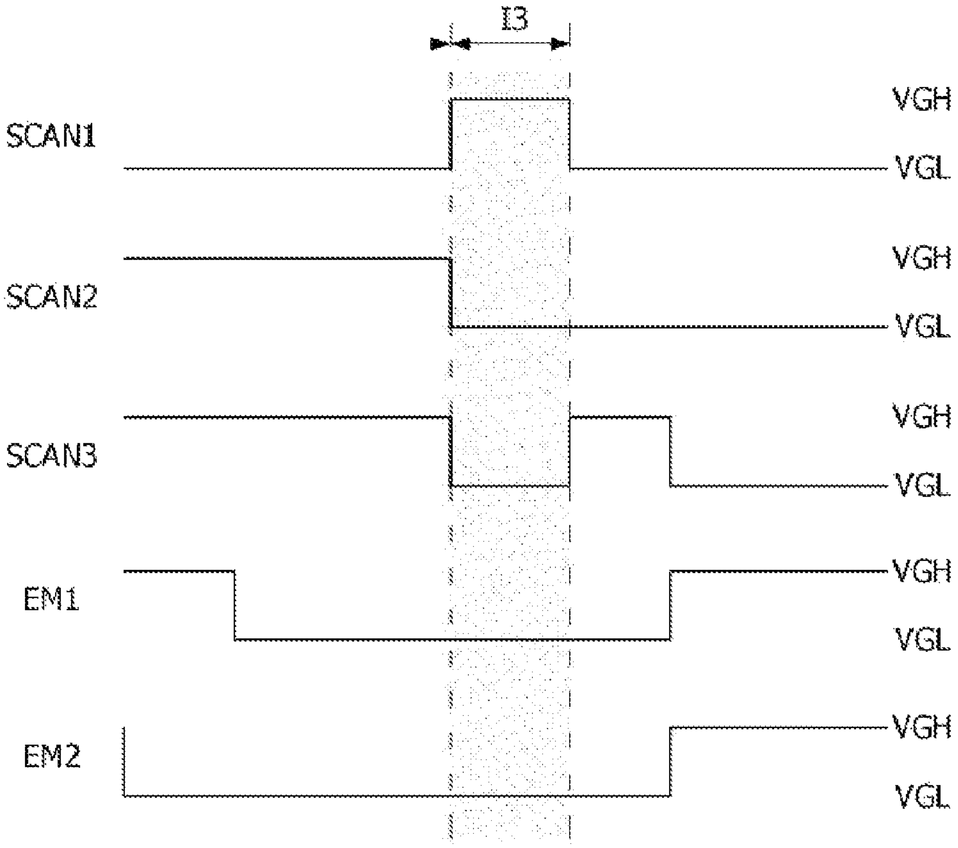

FIG. 29A is a circuit diagram showing a current flowing in the pixel circuit during a third period I3. FIG. 29B is a waveform diagram showing gate signals SCAN1, SCAN2, SCAN3, EM1, and EM2 during the third period I3.

Referring to FIGS. 29A and 29B, the data voltage VDATA of pixel data is applied to the second node G during the third period I3. During the third period I3, the voltage of the first gate signal SCAN1 is the gate-on voltage VGH, and the voltages of the second to fifth gate signals SCAN2, EM1, EM2, and SCAN3 are the gate-off voltage VGL. During the third period I3, the first switch element T1 is turned on, and the second to sixth switch elements T2 to T6 are turned off. At the end of the third period I3, the voltage of the second node G is the data voltage VDATA, and the voltage of the third node S is VDATA−(Vth+VDATA*C'). Here, C'=1−Cst/(Cst+Coled+C21). During the third period I3, the voltage of the fourth node n4 is the anode reset voltage VAR. At the end of the third period I3, the voltage of the capacitor Cst and the gate-source voltage Vgs of the driving element DT are Vth+VDATA*C'.

Figure 30A:
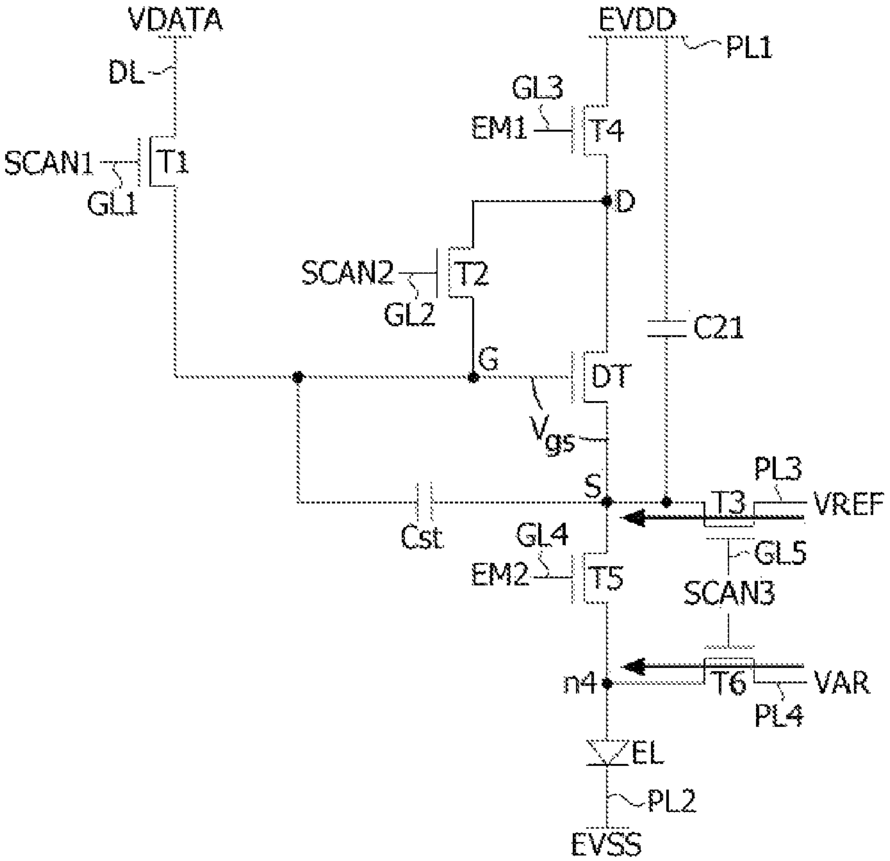
Figure 30B:
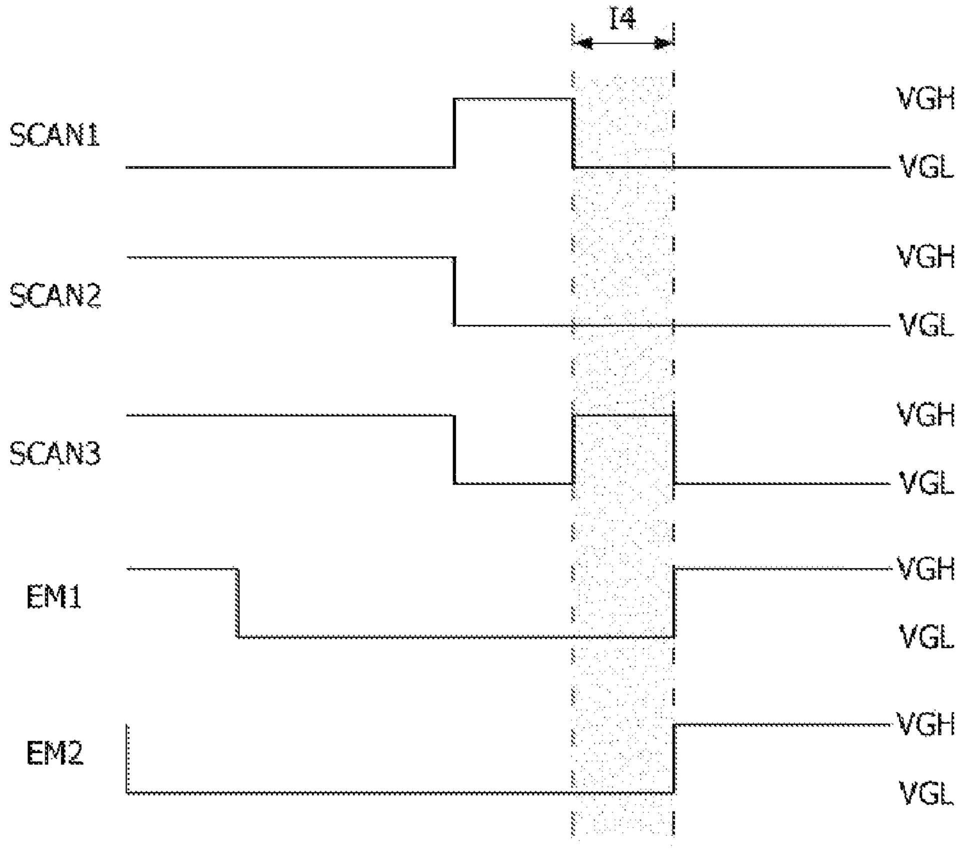

FIG. 30A is a circuit diagram showing a current flowing in the pixel circuit during the fourth period I4. FIG. 30B is a waveform diagram showing gate signals SCAN1, SCAN2, SCAN3, EM1, and EM2 during the fourth period I4.

Referring to FIGS. 30A and 30B, during the fourth period I4, the reference voltage VREF is applied to the third node S and the anode reset voltage VAR is applied to the fourth node n4. During the fourth period I4, the voltage of the fifth gate signal SCAN3 is the gate-on voltage VGH, and the voltages of the other gate signals SCAN1, SCAN2, EM1, and EM2 are the gate-off voltage VGL. During the fourth period I4, the third and sixth switch elements T3 and T6 are turned on, and the other switch elements T1, T2, T4 and T5 are turned off. At the end of the fourth period I4, the voltage of the second node G is varied to VREF+Vth+VDATA*C', and the voltage of the third node S is varied to the reference voltage VREF. Therefore, at the end of the fourth period I4, the voltage of the capacitor Cst and the gate-source voltage Vgs of the driving element DT are Vth+VDATA*C'.

During the fifth period I5, the driving element DT generates a current depending on the gate-source voltage Vgs to drive the light emitting element EL. During the fifth period I5, voltages of the third and fourth gate signals EM1 and EM2 are the gate-on voltage VGH, and voltages of the first, second and fifth gate signals SCAN1, SCAN2 and SCAN3 are the gate-off voltage VGL. During the fifth period I5, the fourth and fifth switch elements T4 and T5 are turned on, and the other switch elements T1, T2, T3 and T6 are turned off.

Figure 31:
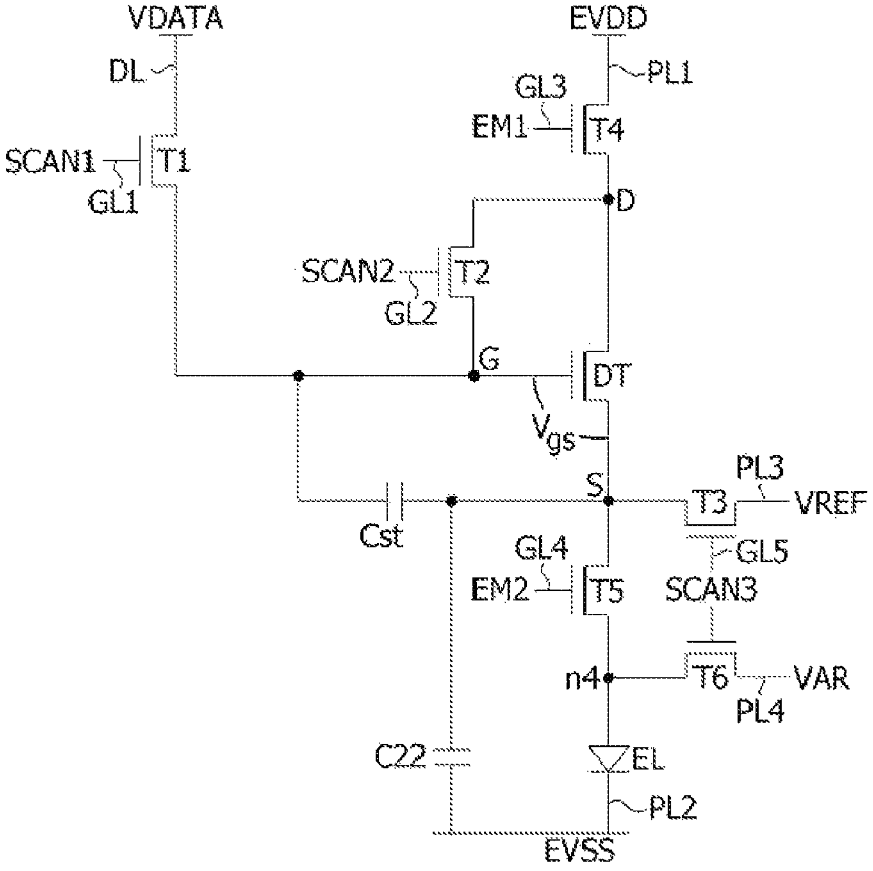
FIG. 31 is a circuit diagram showing a pixel circuit according to an eighth embodiment of the present disclosure.

FIG. 31 is a circuit diagram showing a pixel circuit according to an eighth embodiment of the present disclosure. The gate signals of FIG. 26 or 32 may be applied to the pixel circuits shown in FIG. 31. The driving period of the pixel circuits is divided into first to fifth periods I1 to I5, which are substantially the same as those of the seventh embodiment described above.

Referring to FIG. 31, the pixel circuit may further include a second capacitor C22. The second capacitor C22 may be connected between the third node S and the second constant voltage node PL2.

Figure 32:
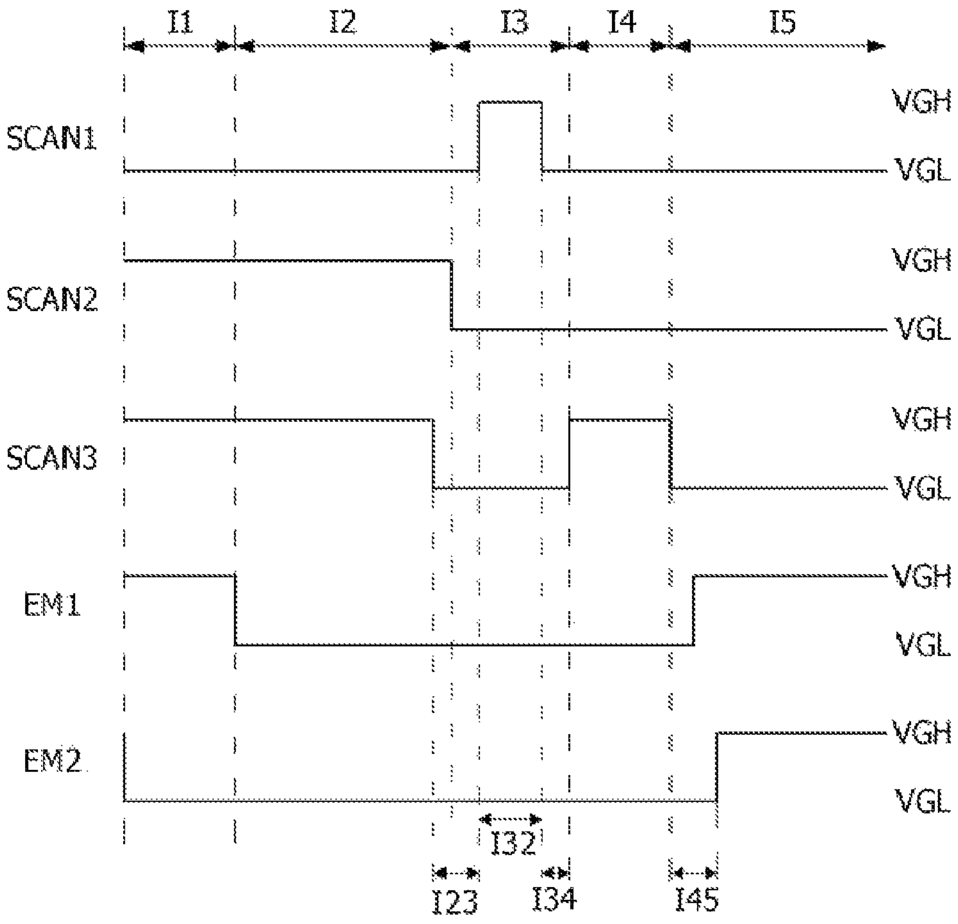
FIG. 32 is a waveform diagram showing other waveforms of gate signals applied to the pixel circuit shown in FIG. 25.

FIG. 32 is a waveform diagram showing other waveforms of gate signals applied to the pixel circuit shown in FIG. 25.

Referring to FIG. 32, at the end of the second period I2 in which the threshold voltage Vth of the driving element DT is sensed, in order to prevent on/off interference between the switch elements T1, T2, T3, and T6, a delay time I23 may be set between the second period I2 and the third period I3. Within the delay time I23, after the fifth gate signal SCAN3 is inverted to the gate-off voltage VGL, the second gate signal SCAN2 is inverted to the gate-off voltage VGL. Then, after the second gate signal SCAN2 is inverted to the gate-off voltage VGL, the first gate signal SCAN1 is inverted to the gate-on voltage VGH.

After the voltage of the first gate signal SCAN1 is maintained at the gate-on voltage VGH for as long as a pulse width section I32 in the third period I3, a delay time I34 may be set between the third period I3 and the fourth period I4. Within this delay time I34, the first gate signal SCAN1 is inverted to the gate-off voltage VGL, and then the fifth gate signal SCAN3 is inverted to the gate-on voltage VGH.

In order to prevent on/off interference between the switch elements T3, T4, T5, and T6 and reduce a boosting time, a delay time I45 may be set between the fourth period I4 and the fifth period I5. Within the delay time I45, after the fifth gate signal SCAN3 is inverted to the gate-off voltage VGL, the third gate signal EM1 is inverted to the gate-on voltage VGH. Then, after the third gate signal EM1 is inverted to the gate-on voltage VGH, the fourth gate signal EM2 is inverted to the gate-on voltage VGH.

Figure 33:
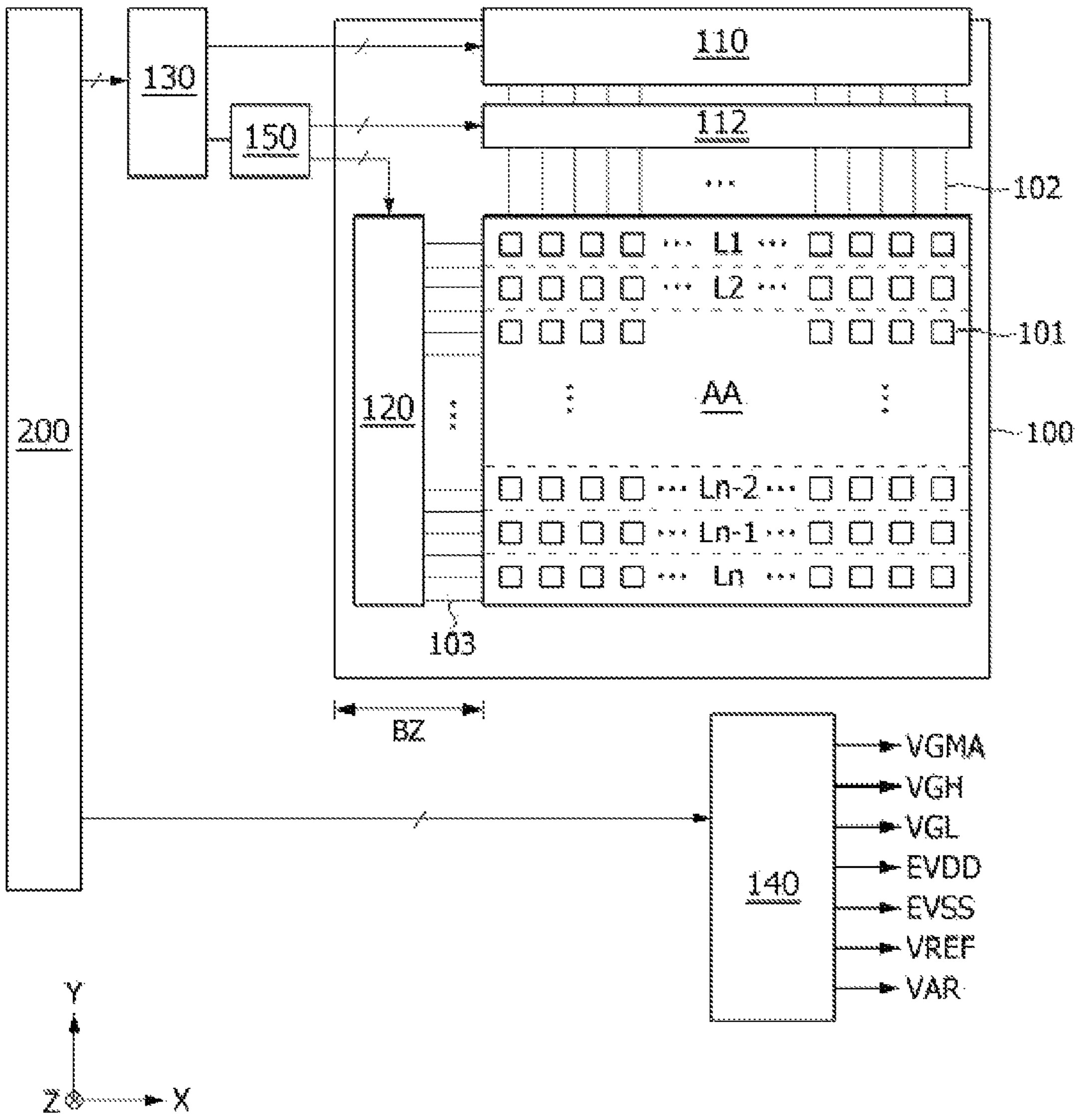
FIG. 33 is a block diagram showing a display device according to one embodiment of the present disclosure.
Figure 34:
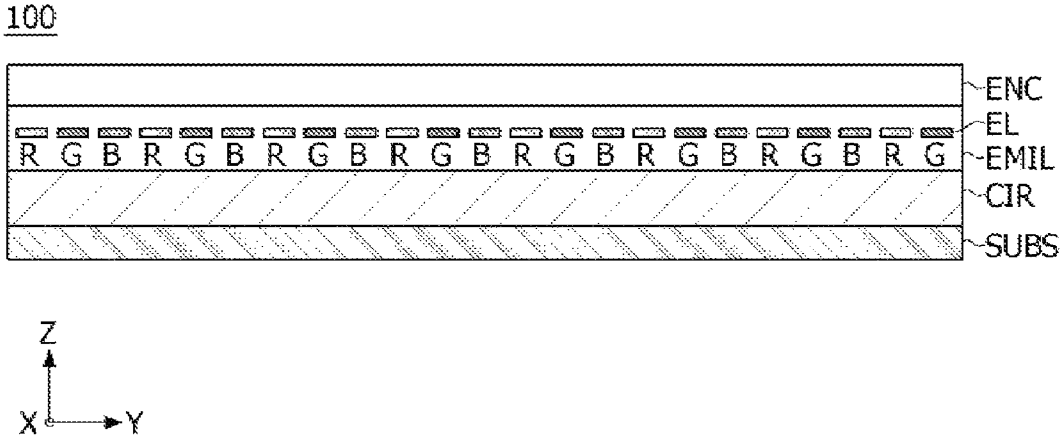
FIG. 34 is a cross-sectional view showing a cross-sectional structure of the display panel shown in FIG. 33.

FIG. 33 is a block diagram showing a display device according to one embodiment of the present disclosure. FIG. 34 is a cross-sectional view showing a cross-sectional structure of the display panel shown in FIG. 33.

Referring to FIGS. 33 and 34, the display device according to an embodiment of the present disclosure includes a display panel 100, a display panel driving circuit for writing pixel data to pixels of the display panel 100, and a power supply 140 for generating power for driving the pixels and the display panel driving circuit.

The display panel 100 may be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 overlap with the data lines 102, and pixels arranged in a matrix form. The display panel 100 may further include power lines commonly connected to the pixels. The power lines are connected to constant voltage nodes of the pixel circuits and supply a constant voltage for driving the pixels 101 to the pixels 101.

Each of the pixels 101 may be divided into a red sub-pixel R, a green sub-pixel G, and a blue sub-pixel B for color implementation. Each of the pixels may further include a white sub-pixel. Each of the sub-pixels may be implemented with any of the pixel circuits described above. Each of the pixel circuits is connected to the data lines, the gate lines, and the power lines.

The pixels may be arranged as real color pixels and pentile pixels. A pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

The cross-sectional structure of the display panel 100 may include a circuit layer CIR, a light emitting element layer EMIL, and an encapsulation layer ENC that are stacked on a substrate SUBS, as shown in FIG. 34.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR may be implemented as an n-channel oxide TFT.

The light emitting element layer EMIL may include a light emitting element EL driven by the pixel circuit. The light emitting element EL may include a light emitting element of a red sub-pixel, a light emitting element of a green sub-pixel, and a light emitting element of a blue sub-pixel. The light emitting element layer EMIL may further include a light emitting element of white sub-pixel. The light emitting element layer EMIL in each of the sub-pixels may have a structure in which the light emitting element and a color filter are stacked. The light emitting elements EL in the light emitting element layer EMIL may be covered by multiple protective layers including an organic film and an inorganic film.

The encapsulation layer ENC covers the light emitting element layer EMIL to seal the circuit layer CIR and the light emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL may be effectively blocked.

A touch sensor layer, not shown, may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are overlap and may planarize the surface of the touch sensor layer. The polarizing plate may improve visibility and contrast ratio by converting the polarization of external light reflected by metal of the touch sensor layer and the circuit layer. The polarizing plate may be implemented as a polarizer or a circular polarizer to which a linear polarizer and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply 140 generates a DC voltage, which be held at a constant voltage at certain times for driving the pixel array of the display panel 100 and the display panel driving circuit. The DC-DC converter may include a charge pump, a regulator, a buck converter, a boost converter, and the like. The power supply 140 may adjust the level of a DC input voltage applied from the host system 200 to generate constant voltages such as a gamma reference voltage VGMA, a gate-on voltage VGH, a gate-off voltage VGL, a pixel driving voltage EVDD, a cathode voltage EVSS, a reference voltage VREF, an anode reset voltage VAR, and the like. The gamma reference voltage VGMA is supplied to a data driver 110. The gate-on voltage VGH and the gate-off voltage VGL are supplied to the gate driver 120. The constant voltages such as the pixel driving voltage EVDD, the cathode voltage EVSS, the reference voltage VREF, the anode reset voltage VAR, and the like are supplied to the pixels 101 via the power lines commonly connected to the pixels 101. It is not required that each of the above just listed voltages or the first, second, third and fourth voltages be constant at all times. In various embodiments, they might each be a constant value at all times or just for a selected period of time and then change to a different DC value at a different time in the circuit operation. In some embodiments, one of more of them might respectively have different values at different times.

The display panel driving circuit writes pixel data of an input image to the pixels of the display panel 100 under the control of the timing controller 130.

The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. A de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 33. The data driver 110 and the touch sensor driver may be integrated into one drive IC (Integrated Circuit). In mobile devices or wearable devices, the timing controller 130, the power supply 140, the data driver 110, and the like may be integrated into one drive IC.

The display panel driving circuit may operate in a low-speed driving mode under the control of the timing controller 130. The low-speed driving mode may be set to reduce power consumption of the display device when an input image does not changed during a predetermined number of frames as a result of analyzing the input image. In the low-speed driving mode, the power consumption in the display panel driving circuit and the display panel 100 may be reduced by lowering a frame frequency at which the pixel data is written to the pixels, that is, a refresh rate, when still images are inputted for a predetermined time or longer. The low-speed driving mode is not limited to a case where the still image is inputted. For example, when the display device operates in a standby mode or when a user command or an input image is not inputted to the display panel driving circuit for a predetermined time or longer, the display panel driving circuit may operate in the low-speed driving mode.

The data driver 110 receives pixel data of the input image received as a digital signal from the timing controller 130 and outputs a data voltage. The data driver 110 converts the pixel data of the input image into a gamma compensated voltage at each frame period using a digital-to-analogue converter (DAC) in a normal driving mode and the low-speed driving mode to outputs the data voltage VDATA. The data driver 110 converts the pixel data of the input image into the gamma compensated voltage to output the data voltage VDATA using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensated voltage for each gray scale. The gamma compensated voltage for each gray scale is provided to the DAC in the data driver 110. The data voltage VDATA is outputted through an output buffer in each of the channels of the data driver 110.

The gate driver 120 may be implemented as a gate in panel (GIP) circuit formed in the circuit layer CIR on the display panel 100 together with the TFT array of the pixel array and wirings. The gate driver 120 may be disposed on a bezel area BZ, which is non-display area of the display panel 100, or may be distributedly disposed in a pixel array in which an input image is reproduced.

The gate driver 120 may be disposed in one or both of non-display areas BZ of the display panel 100 with a display area AA of the display panel 100 interposed therebetween to supply gate pulses to the gate lines 103 in a single-feeding or double-feeding method. The gate driver 120 sequentially outputs pulses of the gate signals to the gate lines under the control of the timing controller 130. The gate driver 120 may sequentially supply the gate signals to the gate lines 103 by shifting the gate signals using a shift register.

The gate driver 120 includes a first shift register that sequentially outputs the first gate signal SCAN1, a second shift register that sequentially outputs the second gate signal SCAN2, a third shift register that sequentially outputs the third gate signal EM1, and a fourth shift register that sequentially outputs the fourth gate signal EM2. The gate driver 120 may further include a fifth shift register that sequentially outputs the fifth gate signal SCAN3.

The timing controller 130 may receive digital video data DATA of an input image from the host system 200 and a timing signal synchronized therewith. The timing signal may include a vertical sync signal Vsync, a horizontal sync signal Hsync, a clock CLK, a data enable signal DE, and the like. Since the vertical period and the horizontal period may be known by counting the data enable signal DE, the vertical sync signal Vsync and the horizontal sync signal Hsync may be omitted. The data enable signal DE has a period of one horizontal period (1H).

The host system 200 may be any one of a television (TV) system, a tablet computer, a notebook computer, a navigation system, a personal computer (PC), a home theater system, a mobile device, a wearable device, and a vehicle system. The host system 200 may scale an image signal from a video source to fit the resolution of the display panel 100 and transmit the scaled image signal to the timing controller 130 together with the timing signal.

The timing controller 130 may multiply an input frame frequency by i in the normal driving mode, and control the operation timing of the display panel driver with a frame frequency of the input frame frequency×i Hz (where, i is a natural number). The input frame frequency is 60 Hz in the National Television Standards Committee (NTSC) scheme and 50 Hz in the Phase-Alternating Line (PAL) scheme.

The host system 200 or the timing controller 130 may vary a refresh rate or frame frequency to fit motion or content characteristics of the input image, or may vary the refresh rate or frame frequency depending on the content of the input image.

The timing controller 130 lowers frequencies of refresh frames in which pixel data is written to pixels in a low-speed driving mode compared to the normal driving mode. For example, in the normal driving mode, the refresh frame frequency at which pixel data is written into pixels may be a frequency of 60 Hz or more, for example, any one of 60 Hz, 120 Hz, 144 Hz, and 240 Hz, and in the low-speed driving mode, the refresh frame frequency may be a frequency lower than that of the normal driving mode. The timing controller 130 may lower driving frequencies of the display panel driving circuit and the pixels by setting a plurality of hold frames after the refresh frame in order to lower a refresh rate of the pixels in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals received from the host system 200. The timing controller 130 synchronizes the data driver 110, the de-multiplexer array 112, the touch sensor driver, and the gate driver 120 by controlling the operation timings of the display panel driving circuit.

A MUX control signal and a gate timing control signal outputted from timing controller 130 may be inputted to the de-multiplexer array 112 and the gate driver 120 through a level shifter 150. The level shifter 150 may receive the gate timing control signal to generate a start pulse and a shift clock. The signal outputted from the level shifter 150 swings between the gate-on voltage VGH and the gate-off voltage VGL.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a driving element including a first electrode connected to a first node, a gate electrode connected to a second node, and a second electrode connected to a third node;

a capacitor having a first electrode connected to the second node and a second electrode connected to the third node;

a first switch element connected between a data line to which a data voltage of pixel data is applied and the second node to be turned on in response to a first gate signal;

a second switch element connected between the first node and the second node to be turned on in response to a second gate signal;

a third switch element configured to be turned on in response to the second gate signal;

a fourth switch element configured to be turned on in response to a third gate signal to connect a first voltage node to which a pixel driving voltage is applied to the first node; and a light emitting element including an anode electrode connected to the third node and a cathode electrode connected to a second voltage node to which a cathode voltage is applied, wherein a reference voltage is applied to the anode electrode of the light emitting element when the third switch element is turned on, and wherein the pixel circuit is driven in the order of a first period, a second period, a third period, and a fourth period;

a voltage of the first gate signal is a gate-on voltage during the third period and is a gate off voltage during the first, second, and fourth periods;

a voltage of the second gate signal is the gate-on voltage during the first and second periods, and is the gate-off voltage during the third and fourth periods;

a voltage of the third gate signal is the gate-on voltage during the first and fourth periods, and is the gate-off voltage during the second and third periods;

the first switch element is turned on in response to the gate-on voltage of the first gate signal and turned off based on the gate-off voltage of the first gate signal;

the second and third switch elements are turned on in response to the gate-on voltage of the second gate signal and turned off based on the gate-off voltage of the second gate signal; and the fourth switch element is turned on in response to the gate-on voltage of the third gate signal and turned off based on the gate-off voltage of the third gate signal.

2. The pixel circuit according to claim 1, wherein the voltage of the first gate signal is inverted to the gate-on voltage after the voltage of the second gate signal is inverted to the gate-off voltage within a first delay time between the second period and the third period; and the voltage of the third gate signal is inverted to the gate-on voltage after the voltage of the first gate signal is inverted to the gate-off voltage within a second delay time between the third period and the fourth period.

3. The pixel circuit according to claim 1, further comprising:

a fifth switch element configured to be turned on in response to a fourth gate signal to connect the third node to the anode electrode of the light emitting element.

4. The pixel circuit according to claim 3, wherein a voltage of the fourth gate signal is the gate-on voltage during the second and fourth periods, and is the gate-off voltage during the first and third periods;

and the fifth switch element is turned on in response to the gate-on voltage of the fourth gate signal and turned off depending on the gate-off voltage of the fourth gate signal.

5. The pixel circuit according to claim 4, wherein the voltage of the fourth gate signal is inverted to the gate-on voltage after the voltage of the third gate signal is inverted to the gate-off voltage within a first delay time between the first period and the second period;

the voltage of the fourth gate signal is inverted to the gate-off voltage before the voltage of the second gate signal is inverted to the gate-off voltage within a second delay time between the second period and the third period; and the voltage of the fourth gate signal is inverted to the gate-on voltage after the voltage of the third gate signal is inverted to the gate-on voltage within a third delay time between the third period and the fourth period.

6. The pixel circuit according to claim 5, the voltage of the first gate signal is inverted to the gate-off voltage before the voltage of the third gate signal is inverted to the gate-on voltage within the third delay time.

7. The pixel circuit according to claim 3, wherein a voltage of the fourth gate signal is the gate-on voltage during the fourth period, and is the gate-off voltage during the first to third periods;

and the fifth switch element is turned on in response to the gate-on voltage of the fourth gate signal and turned off depending on the gate-off voltage of the fourth gate signal.

8. The pixel circuit according to claim 7, wherein the voltage of the first gate signal is inverted to the gate-on voltage after the voltage of the second gate signal is inverted to the gate-off voltage within a first delay time between the second period and the third period; and the voltage of the fourth gate signal is inverted to the gate-on voltage after the voltage of the third gate signal is inverted to the gate-on voltage within a second delay time between the third period and the fourth period.

9. The pixel circuit according to claim 1, further comprising:

a second capacitor connected having a first electrode connected to the third node and a second electrode connected to one of the first voltage node or the second voltage node.

10. A display device comprising:

a display panel on which a plurality of data lines, a plurality of gate lines, a plurality of power lines, and a plurality of pixel circuits are disposed;

a data driver configured to output data voltages of pixel data to the plurality of data lines; and a gate driver configured to sequentially supply gate signals to the plurality of gate lines, wherein each of the plurality of pixel circuits includes:

a driving element configured to include a first electrode connected to a first node, a gate electrode connected to a second node, and a second electrode connected to a third node;

a capacitor connected between the second node and the third node;

a first switch element connected between a data line to which a data voltage of pixel data is applied and the second node to be turned on in response to a first gate signal;

a second switch element connected between the first node and the second node to be turned on in response to a second gate signal;

a third switch element turned on in response to the second gate signal;

a fourth switch element turned on in response to a third gate signal to connect a first voltage node to which a pixel driving voltage is applied to the first node; and a light emitting element configured to include an anode electrode connected to the third node and a cathode electrode connected to a second voltage node to which a cathode voltage is applied, wherein a reference voltage is applied to the third node when the third switch element is turned on, and wherein the pixel circuit is driven in the order of a first period, a second period, a third period, and a fourth period;

a voltage of the first gate signal is a gate-on voltage during the third period and is a gate-off voltage during the first, second, and fourth periods;

a voltage of the second gate signal is the gate-on voltage during the first and second periods, and is the gate-off voltage during the third and fourth periods;

a voltage of the third gate signal is the gate-on voltage during the first and fourth periods, and is the gate-off voltage during the second and third periods;

the first switch element is turned on in response to the gate-on voltage of the first gate signal and turned off based on the gate-off voltage of the first gate signal;

the second and third switch elements are turned on in response to the gate-on voltage of the second gate signal and turned off based on the gate-off voltage of the second gate signal; and the fourth switch element is turned on in response to the gate-on voltage of the third gate signal and turned off based on the gate-off voltage of the third gate signal.

11. The display device according to claim 10, wherein the pixel circuit further includes a fifth switch element turned on in response to a fourth gate signal to connect the third node to the anode electrode of the light emitting element.

12. The display device according to claim 10, wherein the pixel driving voltage and the cathode voltage each have different voltage values at different times.

* * * * *